United States Patent
Matsuda

(10) Patent No.: US 7,469,925 B2
(45) Date of Patent: *Dec. 30, 2008

(54) AIRBAG DEVICE AND OCCUPANT CLASSIFICATION DEVICE

(75) Inventor: Mieko Matsuda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/010,280

(22) Filed: Jan. 23, 2008

(65) Prior Publication Data

US 2008/0164682 A1 Jul. 10, 2008

Related U.S. Application Data

(63) Continuation of application No. 11/136,497, filed on May 25, 2005, now Pat. No. 7,350,809.

(30) Foreign Application Priority Data

| May 26, 2004 | (JP) | ............................ P2004-156694 |
| May 12, 2005 | (JP) | ............................ P2005-140365 |

(51) Int. Cl.
*B60R 21/015* (2006.01)
*B60R 21/01* (2006.01)

(52) U.S. Cl. ...................... 280/735; 180/268

(58) Field of Classification Search ................ 180/268; 280/735, 801.1; 382/103, 106; 701/45–48; 340/572.1, 457, 451.1
See application file for complete search history.

(56) References Cited

U.S. PATENT DOCUMENTS

| 6,005,958 | A | 12/1999 | Farmer et al. |
| 6,213,510 | B1 | 4/2001 | Suyama |
| 6,439,333 | B2 | 8/2002 | Domens et al. |
| 6,480,616 | B1 | 11/2002 | Hata et al. |
| 7,127,081 | B1 | 10/2006 | Erdem |
| 7,194,109 | B2 | 3/2007 | Nakamura et al. |
| 7,311,326 | B2 | 12/2007 | Matsuda et al. |
| 2007/0023494 | A1 | 2/2007 | Haraszti et al. |
| 2007/0081695 | A1 | 4/2007 | Foxlin et al. |

FOREIGN PATENT DOCUMENTS

JP 2001-213268 8/2001

OTHER PUBLICATIONS

Park et al., Invisible Marker Tracking for AR, Dept. of ECE, Hanyang University Seoul, Korea, Proceedings of the Third IEEE and ACM International Symposium on Mixed and Augmented Reality (ISMAR 2004), copyrighted Jun. 2004 IEEE.

*Primary Examiner*—Christopher Ellis
*Assistant Examiner*—Joseph Rocca
(74) *Attorney, Agent, or Firm*—Finnegan, Henderson, Farabow, Garrett & Dunner, L.L.P.

(57) ABSTRACT

A seating state of an occupant including a presence, absence, and posture of the occupant is accurately determined. The device includes a seat belt provided with marks whose image is to be taken, an imaging portion that takes an image of the marks provided on the seat belt, and a seating state determining portion that determines the seating state of the occupant based on the image of the marks taken by the imaging portion.

1 Claim, 22 Drawing Sheets

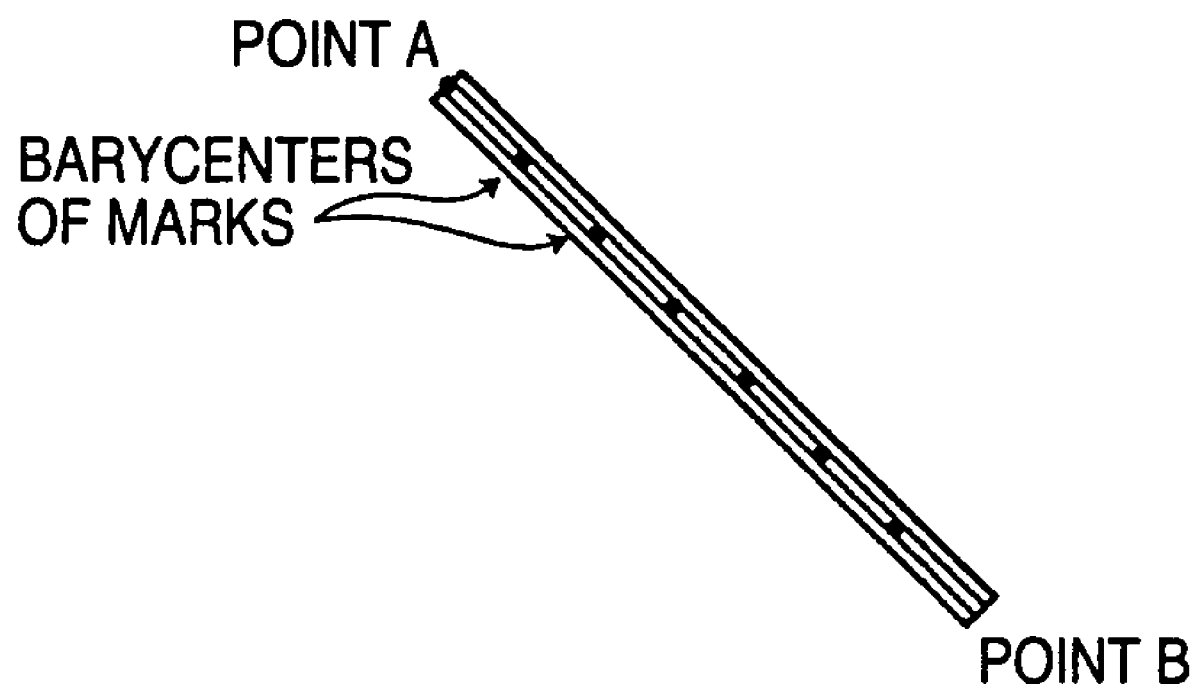

TOP VIEW

FRONT VIEW

TOP VIEW

FRONT VIEW

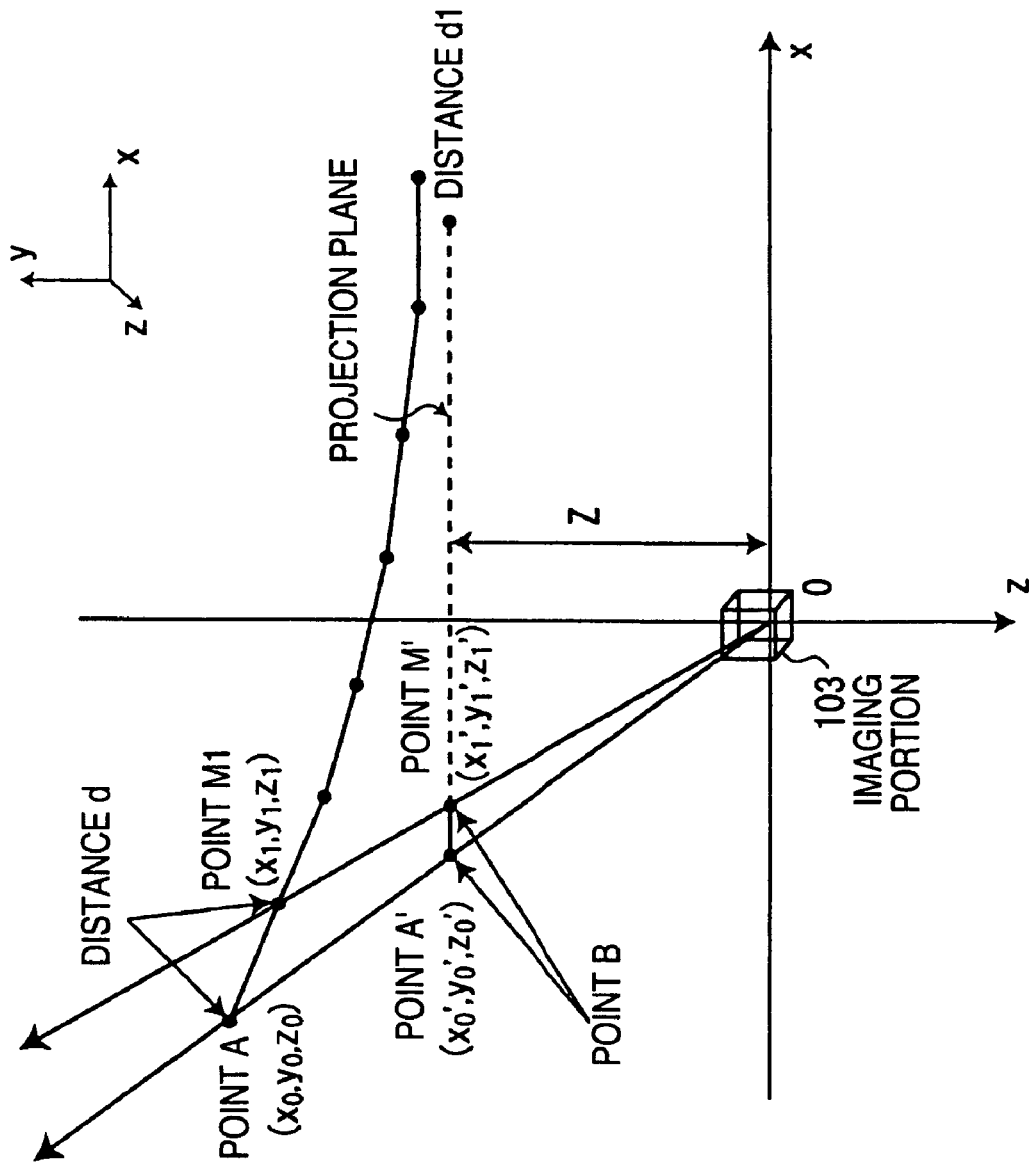

FIG. 10

| PATTERN NO. | SEATING STATE | POINT SEQUENCE PATTERN | | | | | | | | | | | | |
|---|---|---|---|---|---|---|---|---|---|---|---|---|---|---|
| $P_1$ | LEANING FORWARD | 3 | 3 | 4 | 5 | 7 | 7 | 7 | 5 | 3 | 0 | 0 | 0 | 0 |
| $P_2$ | NORMAL POSTURE | 5 | 7 | 7 | 9 | 10 | 7 | 9 | 9 | 3 | 0 | 0 | 0 | 0 |
| $P_3$ | RECLINING | 10 | 10 | 10 | 10 | 10 | 10 | 10 | 10 | 9 | 0 | 0 | 0 | 0 |
| $P_4$ | NO OCCUPANT | 0 | 0 | 0 | 0 | 0 | 0 | 0 | 0 | 0 | 0 | 0 | 0 | 0 |
| $P_5$ | CHILD SAFETY SEAT | 3 | 3 | 3 | 5 | 7 | 7 | 7 | 7 | 5 | 5 | 3 | 3 | 3 |
| .. | .. | .. | .. | .. | .. | .. | .. | .. | .. | .. | .. | .. | .. | .. |
| $P_{NP}$ | | | | | | | | | | | | | | |

FIG. 13

| PATTERN NO. | SEATING STATE | POINT SEQUENCE PATTERN | | | | | | | | | | | | | |
|---|---|---|---|---|---|---|---|---|---|---|---|---|---|---|---|
| $P_1$ | LEANING FORWARD (1) | 3 | 3 | 4 | 5 | 7 | 10 | 7 | 7 | 5 | 3 | 0 | 0 | 0 | 0 |
| $P_2$ | LEANING FORWARD (2) | 2 | 2 | 3 | 4 | 5 | 7 | 11 | 8 | 7 | 5 | 3 | 0 | 0 | 0 |
| $P_3$ | NORMAL POSTURE | 5 | 7 | 7 | 9 | 9 | 7 | 11 | 8 | 7 | 5 | 0 | 0 | 0 | 0 |
| $P_4$ | RECLINING | 10 | 10 | 10 | 10 | 10 | 10 | 10 | 10 | 10 | 9 | 0 | 0 | 0 | 0 |
| $P_5$ | NO OCCUPANT | 0 | 0 | 0 | 0 | 0 | 0 | 0 | 0 | 0 | 0 | 0 | 0 | 0 | 0 |
| $P_6$ | CHILD SAFETY SEAT | 3 | 3 | 3 | 5 | 7 | 7 | 7 | 5 | 5 | 3 | 3 | 3 | 3 | 3 |
| .. | | .. | .. | .. | .. | .. | .. | .. | .. | .. | .. | .. | .. | .. | .. |
| $P_{NP}$ | | | | | | | | | | | | | | | |

CONTINUOUS MARK STRING U

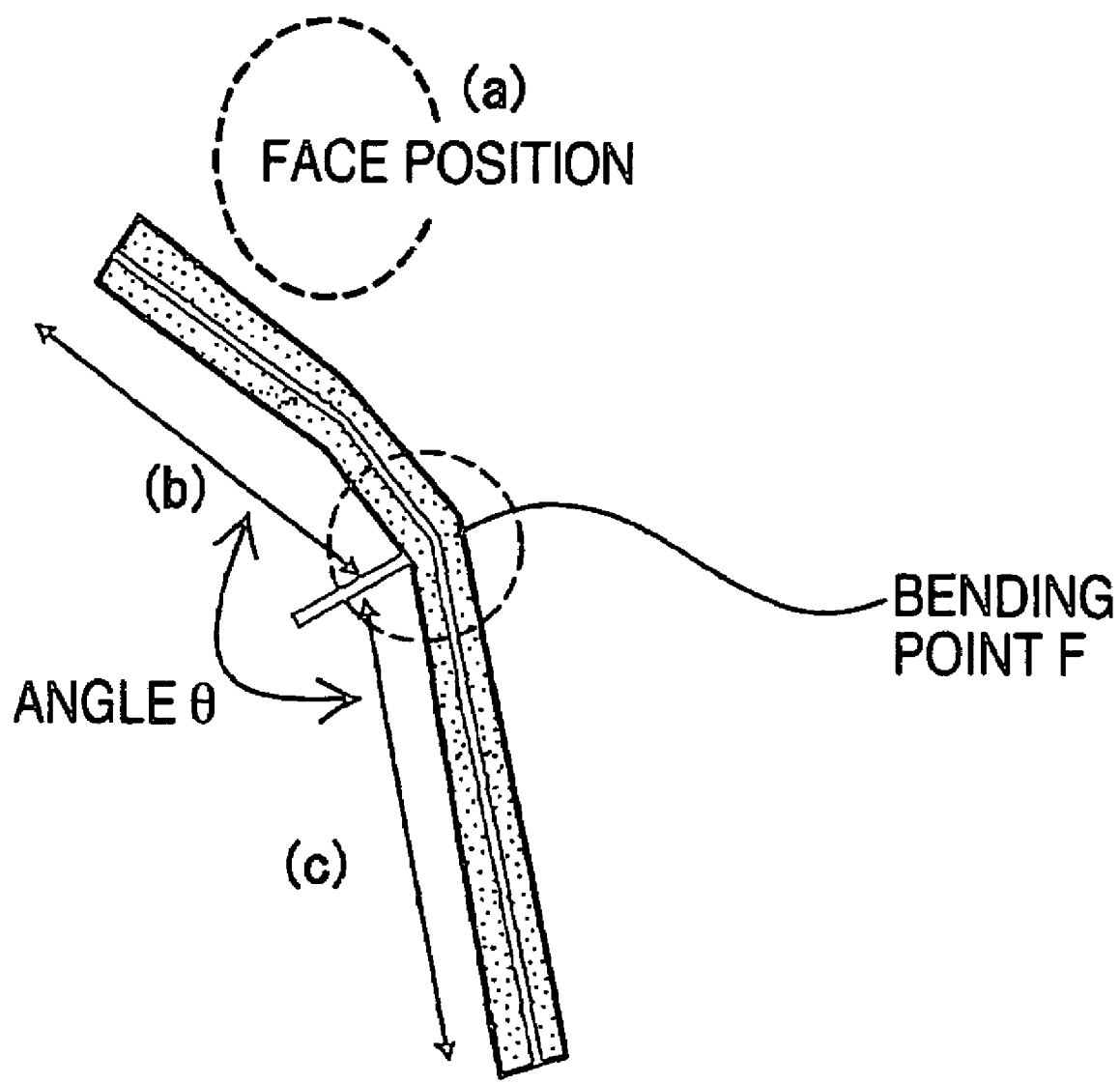

AIRBAG DEVICE AND OCCUPANT CLASSIFICATION DEVICE

CROSS-REFERENCE TO RELATED APPLICATIONS

This application is a continuation of application Ser. No. 11/136,497, filed on May 25, 2005, now U.S. Pat. No. 7,350,809 which claims the benefit of priority to Japanese Patent Application No. P2004-156694, filed on May 26, 2004, and Japanese Patent Application No. P2005-140365, filed on May 12, 2005, the entire contents of which are incorporated herein by reference.

BACKGROUND OF THE INVENTION

1. Field of the Invention

The present invention relates to an occupant classification device that detects the seating state of an occupant and an airbag device that controls the operation of an airbag based on the seating state.

2. Description of the Related Art

There have been known devices that detect a distance between an object and a predetermined position, including various known methods that detect the distance. The detection result is used for various control parameters. For example, in an airbag system that inflates an airbag to protect a seat's occupant against an impact in a vehicle collision, a technique of detecting a distance between the occupant and a predetermined position for controlling the airbag operation has been proposed (see for example Japanese Patent Laid-Open (KOKAI) No. 2001-213268).

The airbag system detects an impact in the event of a vehicle collision and inflates the bag by a prescribed explosive force. If the distance between the airbag and the occupant is small because of the sitting posture of the occupant, the inflated airbag could possibly injure the occupant. Accordingly, the technique disclosed by Japanese Patent Laid-Open (KOKAI) No. 2001-213268 is directed to a solution to the problem where a distance between a predetermined position in front of the occupant and the occupant is measured, and the operation of the airbag is controlled based on the measured distance.

According to the disclosed technique, a spot beam light is directed toward the seat's occupant, and a distance to the occupant is detected based on the image of the occupant irradiated with the beam light, i.e., based on the position of the beam light in the image. In this way the distance to the position irradiated with the beam light can be detected, but the distance to the other body parts cannot be detected. Therefore, the accurate seating state of the occupant in the seat cannot be determined.

More specifically, since the object for distance detection can be in various postures, similar to a seat's occupant in a vehicle, a distance to a position of one part of the object can be specified, but the distance to another part of the object cannot be specified. By the distance detecting method, not only is the seating state of the seat occupant inaccurately detected but also the airbag cannot appropriately be controlled based on the seating state.

SUMMARY OF THE INVENTION

According to an aspect of the present invention, a device for classifying a seating state of an occupant includes a seat belt having a string of labels, a camera which takes an image of the string of labels on the seat belt, a detector which detects an arrangement pattern of the string of labels on the image and an estimator which estimates the seating state of an occupant fastening the seat belt based on the arrangement pattern.

According to another aspect of the present invention, an airbag device includes the above-described device for classifying an occupant, an airbag having a mechanism for adjusting its inflation amount or speed, and a controller which controls the inflation amount or speed of the airbag according to the seating state of the occupant estimated by the estimator of the device for classifying an occupant.

According to yet another aspect of the present invention, an airbag device includes a seat belt having a string of labels, a camera which takes an image of the string of labels on the seat belt, an airbag having a mechanism for adjusting its inflation amount or speed, a processor, and a memory accessible from the processor. The memory stores program code executed by the processor, and the program code includes steps of detecting an arrangement pattern of the string of labels from the image, estimating a seating state of the occupant fastening the seat belt based on the arrangement pattern, and controlling the inflation amount or speed of the airbag based on the estimated seating state of occupant.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory and are intended to provided further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention.

FIG. 5 is an example of the barycentric coordinates of marks obtained by a seating state determining portion;

FIG. 8 is an illustrative graph showing how to calculate a distance to an upper part of an occupant's body from an imaging portion;

FIG. 10 is an example of a seating state determination table of the airbag device according to the first embodiment;

FIG. 13 is an example of a seating state determination table of the airbag device according to the second embodiment;

FIG. 20 is an example of a bending point in a mark string obtained by a seating state determining portion;

DETAILED DESCRIPTION OF THE PREFERRED EMBODIMENTS

Now, an occupant classification device and an airbag device according to embodiments of the present invention will be described with reference to the accompanying drawings. Wherever possible, the same reference numbers will be used throughout the drawings to refer to the same or like parts.

First Embodiment

Figure 1:
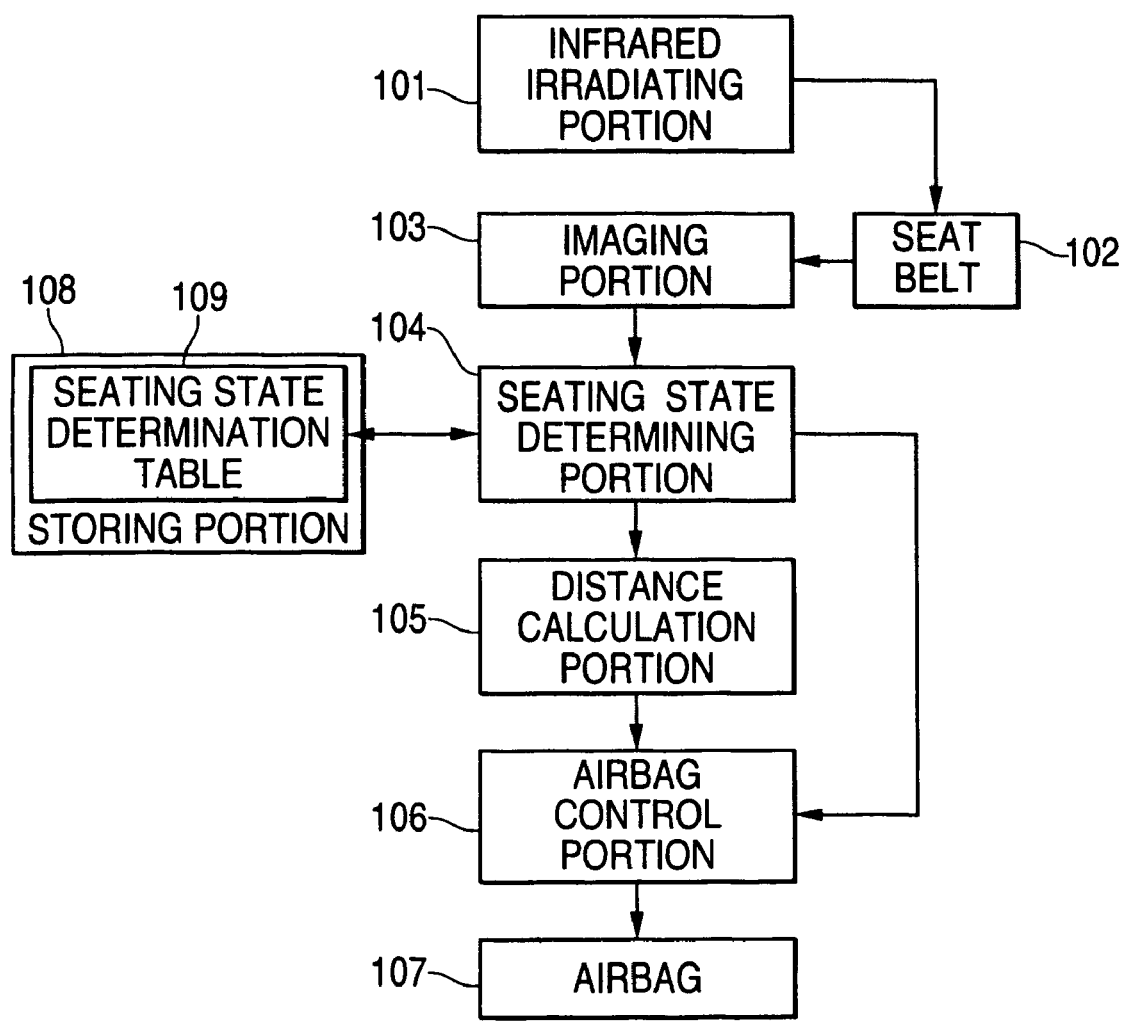
FIG. 1 is a block diagram of the configuration of an airbag device according to a first embodiment of the invention.

FIG. 1 is a block diagram of the configuration of an airbag device functioning as an occupant classification device according to a first embodiment.

As shown in FIG. 1, the airbag device 100 includes an infrared irradiating portion 101, a seat belt 102, an imaging portion 103, a seating state determining portion 104, a distance calculating portion 105, an airbag control portion 106, an airbag 107, and a storing portion 108. The storing portion 108 has a seating state determination table 109. According to the embodiment, the seating state is constantly determined by the seating state determining portion 104 and a distance between the occupant 203 and the airbag 107 is constantly calculated by the distance calculating portion 105. In the event of a crash, the airbag 107 is controlled based on the predetermined seating state and the calculated distance. However, the embodiment is not limited to this sequence of process. The seating state determinations include the presence and absence of an occupant, the posture of the occupant, and the distance from a reference position to the occupant.

The infrared irradiating portion 101 directs infrared light to the seat belt 102 fastened around or across the seat's occupant 203. According to the embodiment, light is directed from a frontal position of the occupant 203 toward approximately the center of the width of the seat. The infrared irradiating portion 101 irradiates light and the imaging portion 103 takes an image such that the seating state of the occupant 203 can be determined unaffected by the external light. The use of infrared light prevents the occupant 203 from being preoccupied about the use of irradiation while the seating state is determined.

It should be noted that the position of the irradiating portion 101 is not limited to that of the embodiment, and that the irradiating portion 101 may be provided in any position that allows the light to be irradiated over the entire seat belt 102. According to the embodiment, the infrared light is constantly irradiated by the infrared irradiating portion 101. However, irradiation may be carried out otherwise as long as it is carried out at the time of imaging by the imaging portion 103.

The seat belt 102, which fixes and keeps the occupant 203 in a seated state, has labels that reflect infrared light. As the seat belt 102 is pulled in relation to the positioning of the upper part of the occupant's body 203, the state of the seat belt 102 varies as a result of the posture of the occupant 203. Certain body parts of the occupant 203 are fixed with the fastened seat belt 102 and cannot be moved without changing the seating state. Therefore, the seat belt 102 changes as the seating state changes. It is noted that the seat belt 102 may be provided around or across the upper part of the seat occupant's body 203, excluding the arms, and must change depending on the posture of the occupant 203.

Marks are provided on the seat belt 102, which correspond to the above-mentioned labels on the seat belt 102, and are made of a material that reflects infrared light. Alternatively, the marks can be coated with a paint that reflects infrared light. The marks may be in any shape but must be recognized by the seating state determining portion 104 as the marks for determining the seating state. The mark is a dark circle according to the embodiment. The shape of the dark circles corresponds to a predetermined shape and the marks are provided on the seat belt 102 at prescribed intervals. The interval between the marks is referred to as "d." It should be noted that the type of light that can be reflected by the marks is not limited to infrared light. The marks can reflect any light irradiated by their radiating portion.

The imaging portion 103 uses the light from part of the infrared irradiating portion 101 reflected by the marks on the seat belt 102 and takes an image of those marks. According to the first embodiment, the imaging portion 103 is carried out in a direction from the front of the occupant 203 toward approximately the center of the width of the seat. As described above, the state of the seat belt 102 changes based on the seating state, i.e. the posture, of the occupant 203. Therefore, the state of the marks on the seat belt 102 whose image is taken by the imaging portion 103 changes accordingly as well. In the first embodiment, a television camera capable of imaging only infrared light is used as the imaging portion 103, and infrared light irradiated by the infrared irradiating portion 101 is reflected by the marks provided on the seat belt 102. The imaging portion 103 takes only infrared light, such that the image of the marks and other images can easily be distinguished. It should be noted that although the imaging portion 103 can take only an image of infrared light in this first embodiment, other types of cameras may be employed as long as they can take an image of the marks provided on the seat belt 102. Furthermore, the imaging portion 103 may be provided in any position as long as it can take an image of the marks provided on the seat belt 102.

Figure 2:
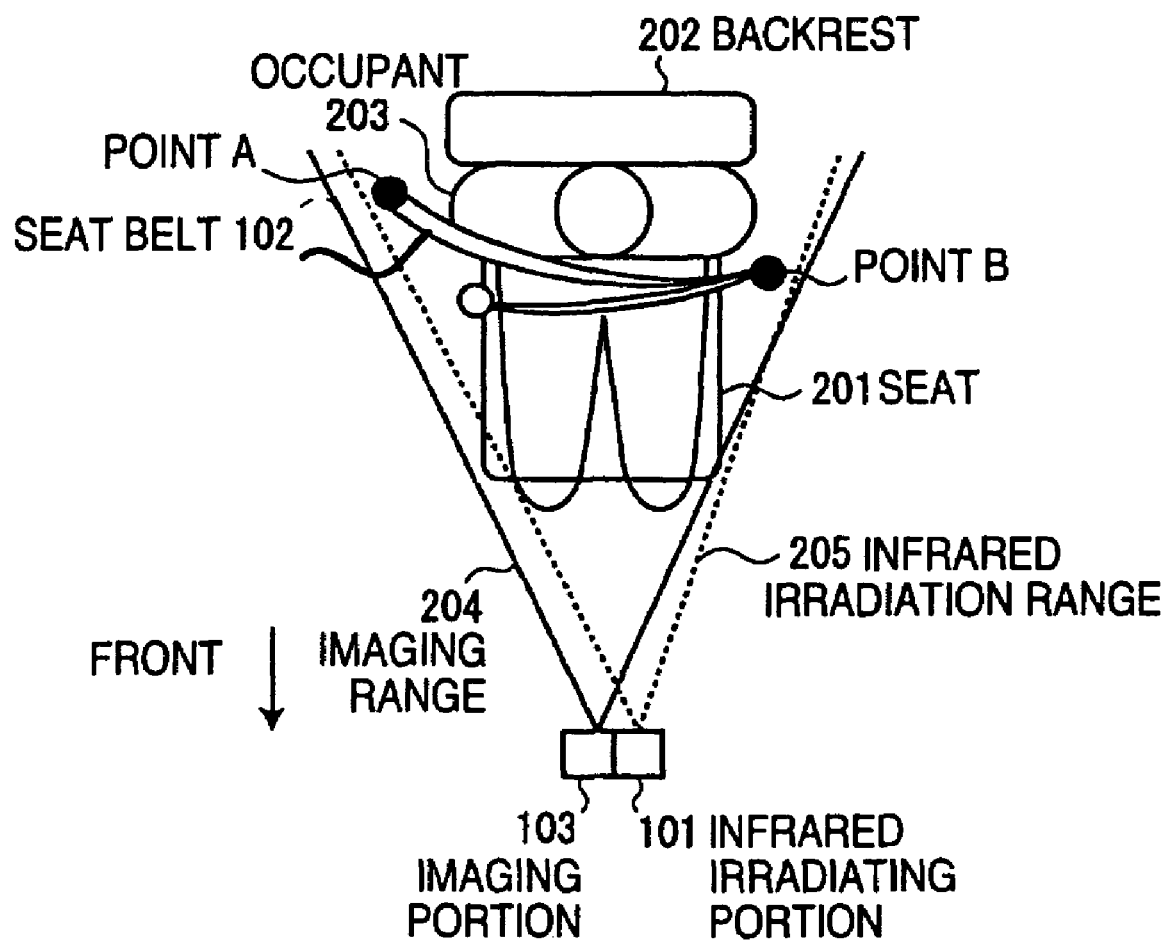
FIG. 2 is a top view showing a positional relationship between an infrared irradiation range of an infrared irradiating portion, an imaging range of an imaging portion, and a seated occupant wearing a seat belt.

FIG. 2 is a top view showing the relationship between the infrared light irradiation range 205 of the infrared irradiating portion 101, the imaging range 204 of the imaging portion 103, and a seat's occupant 203 wearing a seat belt 102. The infrared irradiation range 205 of the infrared irradiating portion 101 does not have to match the imaging range 204 of the imaging portion 103. However, the infrared irradiation range 205 and the imaging range 204 must be determined such that points A and B and the marks between them on the seat belt 102 are included in these ranges. Point A on the seat belt 102 is located on the vehicle body, above the shoulder level of the occupant 203, while point B is located on the seat. These points are fixed in position regardless of how the posture of the occupant 203 changes. The distance from each of the points to the imaging portion 103 is also kept constant.

Figure 3:
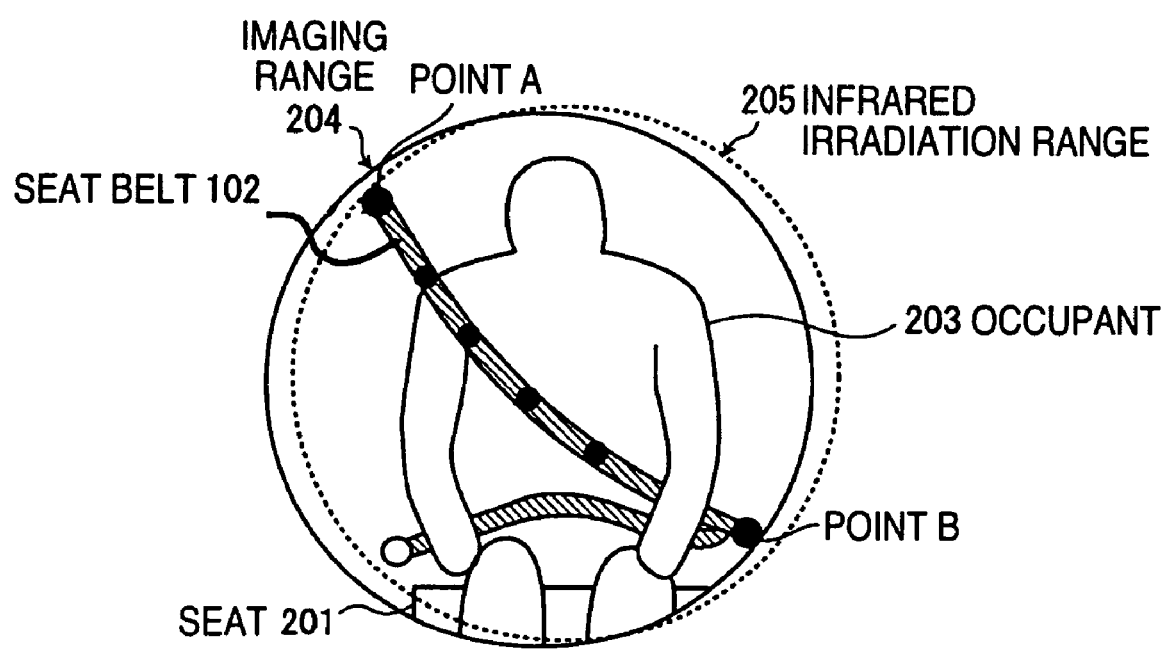
FIG. 3 is a front view showing a positional relationship between an infrared irradiation range of an infrared irradiating portion, and an imaging range of an imaging portion.

FIG. 3 shows the infrared irradiation range 205 of the infrared irradiating portion 101 and the imaging range 204 of the imaging portion 103 as the ranges are viewed from the front of the occupant 203. As described above, the imaging portion 204 and the infrared irradiation range 205 are provided such that an image of points A and B and the marks between them on the seat belt 102 can be taken.

Referring back to FIG. 1, the seating state determining portion 104 determines the seating state of the occupant 203, i.e. the posture, based on the marks provided on the seat belt 102 in the image taken by the imaging portion 103. In this first embodiment, seating states determined by the seating state determining portion 104 include but are not limited to "leaning forward," "normal posture," "reclining,". "no occupant," and "child safety seat."

The seating state according to this first embodiment refers not only to the posture of the occupant 203 but also to the use state of the seat 201, such as "no occupant" (the state without the occupant 203) and "child safety seat" (the state in which a child safety seat is attached to the seat 201 using the seat belt 102).

Figure 4:
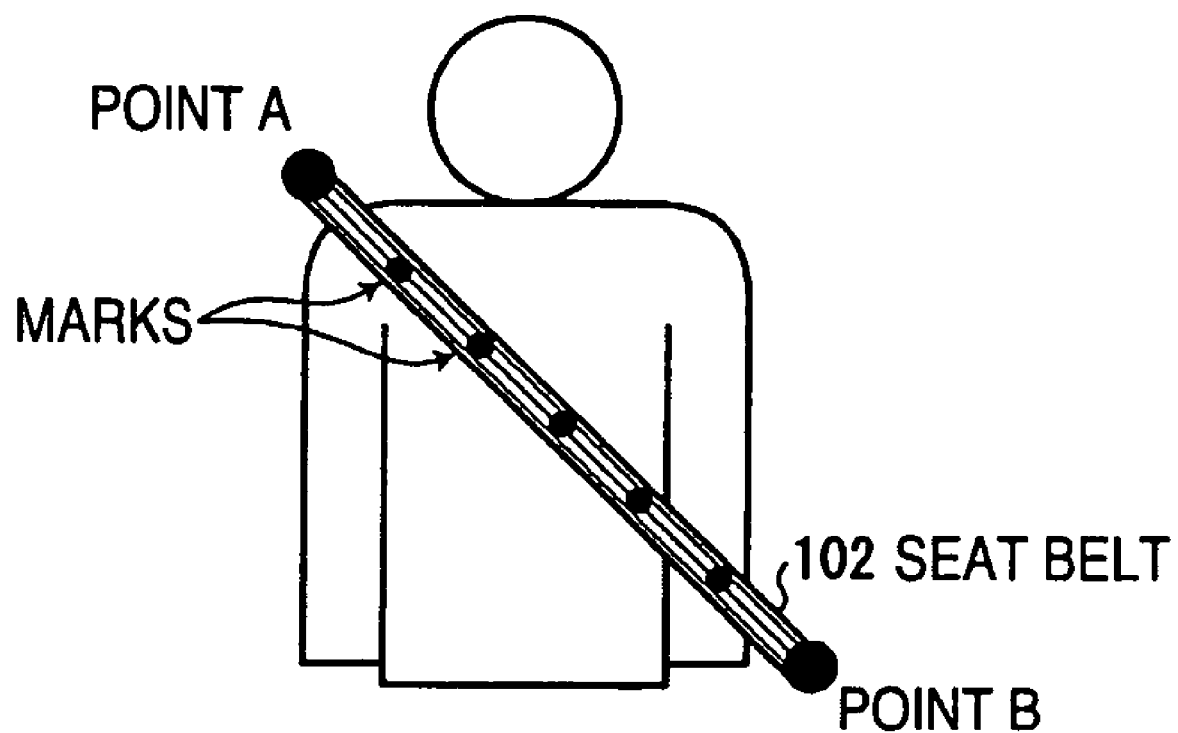
FIG. 4 is an example of an image input to a seating state determining portion.

FIG. 4 shows an example of an image taken by the imaging portion 103 and input to the seating state determining portion 104. The seating state determining portion 104 digitizes the input image by a general digitizing method, and extracts the predetermined shape of the marks provided on the seat belt 102. The marks, according to this first embodiment, are shown as dark circles in FIG. 4. A region of black pixels coupled to the marks are extracted. If the region has a size within a range of predetermined thresholds, the region is determined as a mark and the position representing the barycenter of the mark is obtained. Alternatively, instead of obtaining the barycentric position, the contour of the extracted mark may be extracted, with the shape being approximated by a circle, such that the position of the center of the circle is obtained. In addition to obtaining the barycenters of the marks, the barycenters of points A and B are also obtained. FIG. 5 shows an example of the barycentric position of the marks obtained based on the image obtained in FIG. 4 by the above described method. It is noted that the thresholds to determine whether or not the region having coupled black pixels is a mark are determined based on the size of the mark and the distance from the imaging portion 103 to the seat belt 102.

The seating state determining portion 104 next compares a pattern of the distances between the barycentric positions of the marks obtained on the image to a pattern of the distances between the marks found in a seating state determination table 109, which will be described later on. Based on the results of this comparison, the seating state of the occupant 203 associated with the most similar pattern of the distances between the marks is determined as the present seating state of the occupant 203.

Obtaining the seating state of the occupant 203 by comparing the pattern of the distances between the barycentric positions of the marks on the image and the patterns of the distances between the marks stored in the seating state determination table 109 will be now be described. It should be noted that the drawings in connection with the following description are simplified for the ease of illustration.

Figure 6A:
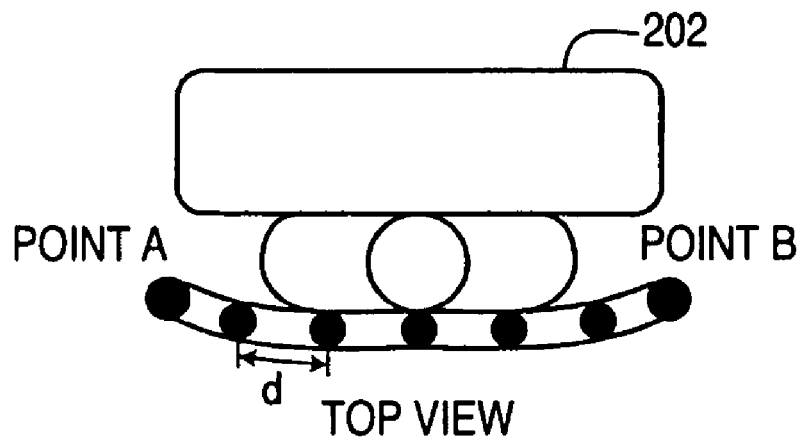
FIG. 6A is a top view of an arrangement of marks on a seat belt fastened around or across an occupant leaning against a backrest.
Figure 6B:
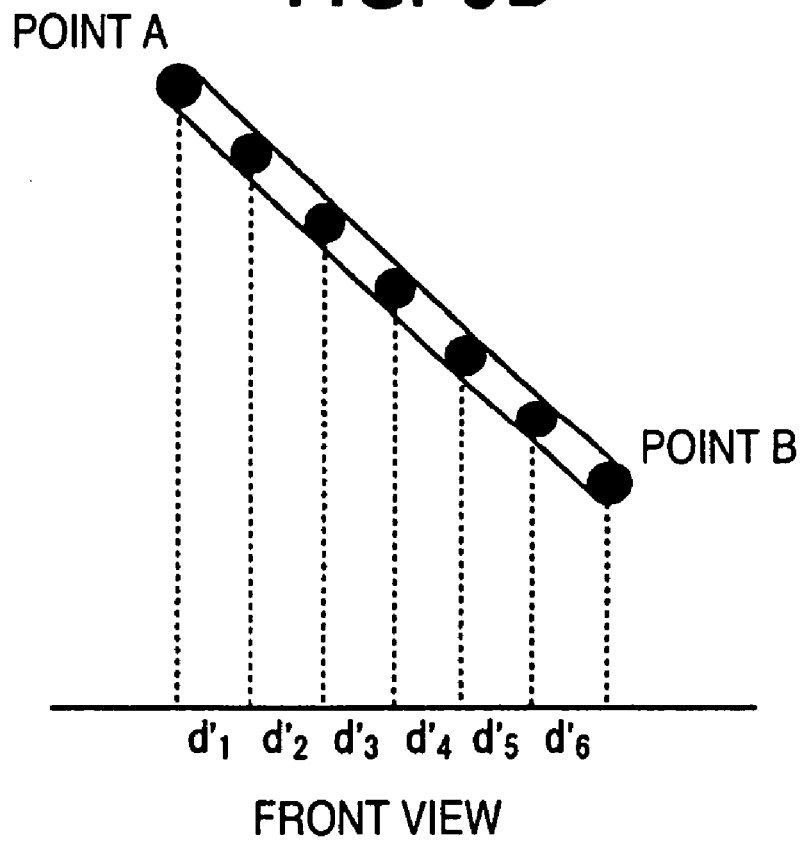
FIG. 6B is a front view of an arrangement of marks on a seat belt fastened around or across an occupant leaning against a backrest.

FIG. 6A is a top view showing the occupant 203 leaning against a backrest 202 with his seat belt 102 fastened. FIG. 6B is a front view showing the occupant 203 in the same position as FIG. 6A. As shown in FIG. 6A, when the state of the occupant 203 leaning against the backrest 202 is viewed from the top, the seat belt 102 is located along an approximately straight line from point A to point B. Therefore, as shown in FIG. 6B, when the state is viewed from the front, the distances d1' to d6' between the marks are substantially equal.

Figure 7A:
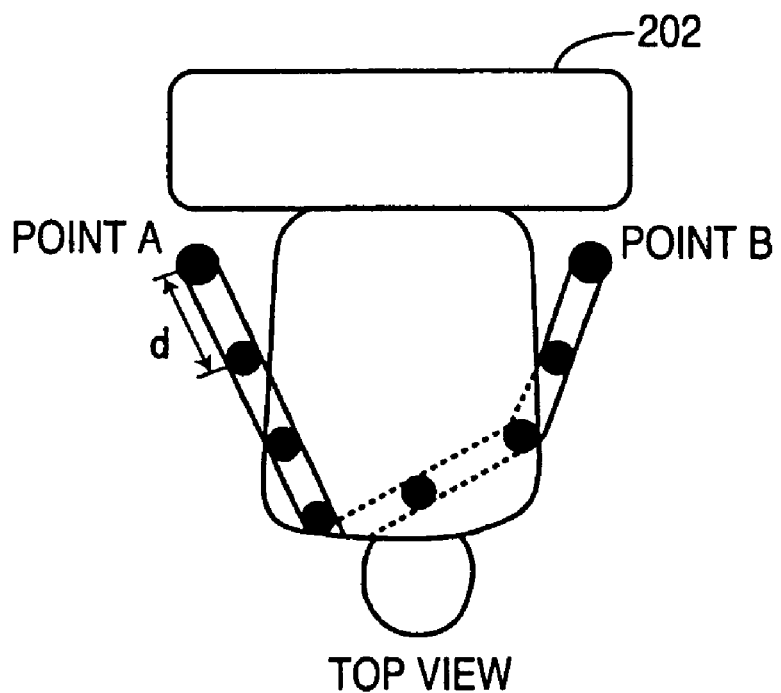
FIG. 7A is a top view of an arrangement of marks on a seat belt fastened around or across an occupant leaning forward.
Figure 7B:
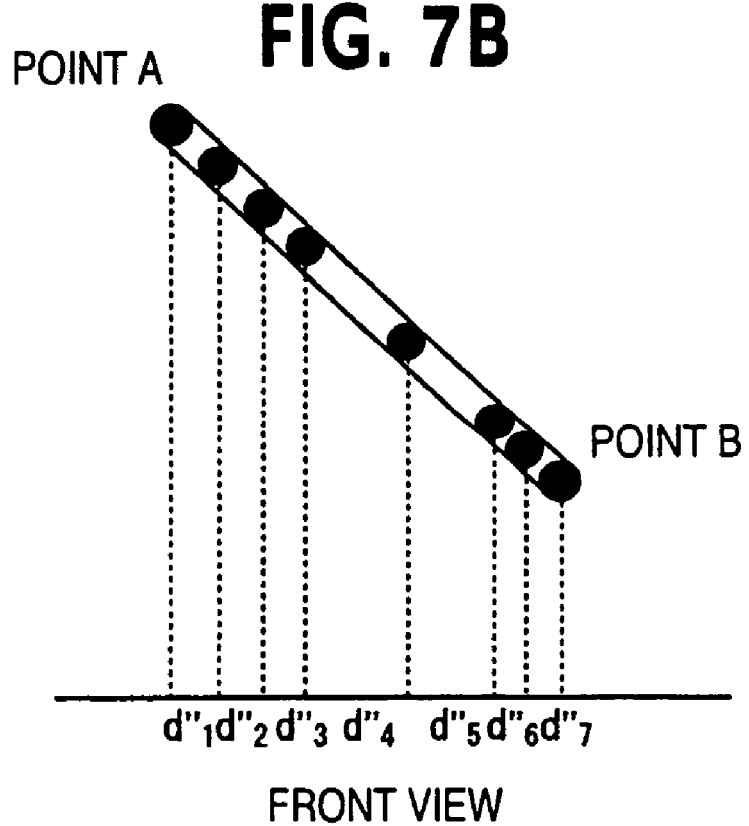
FIG. 7B is a front view of an arrangement of marks on a seat belt fastened around or across an occupant leaning forward.

In contrast, FIG. 7A is a top view showing the occupant 203 leaning forward rather than leaning against the backrest 202, with his seat belt 102 fastened. FIG. 7B is a front view showing the occupant 203 in the same position as FIG. 7A. As shown in FIG. 7A, when the state of the occupant 203 leaning forward is viewed from the top, the seat belt 102 is bent at a few locations as it is pulled by the occupant 203. Therefore, as shown in FIG. 7B, among the distances d1" to d6" between the marks, distances near both ends are shorter than those near the center.

When there is no occupant 203, and the seat belt 102 is not used, the marks are not detected by the imaging operation of the imaging portion 103, and naturally, the distances between the marks are not obtained.

In this way, the distances between the marks are different depending on the seating-state of the occupant 203, i.e. the posture. The previously stored distances between the marks for each of the seating states of the occupant 203 can be compared to the distances between the barycentric coordinates of the marks obtained by the imaging operation in order to obtain the present seating state of the occupant 203. When, for example, the distances d1' to d6' between the marks are substantially equal, as described above, it is determined that the occupant 203 is leaning against the backrest 202. When the distances on both ends between the marks are narrower than in the center, it is determined that the occupant 203 is leaning forward. When the distances between the marks cannot be obtained at all, it is determined that there is no occupant in the seat. It is noted that specific seating states determined according to the first embodiment will be described later.

The storing portion 108 stores the seating state determination table 109. The storing portion 108 is not limited to a certain memory (ROM or RAM) and can be any type of storing medium as long as it can store the seating state determination table 109.

The seating state determination table 109 includes patterns of distances between the marks as point sequence patterns in association with seating states. The point sequence pattern corresponds to the mark arrangement information. It should be noted that the specific method of determining the seating state by comparing the seating state determination table 109 to the pattern of distances between the marks will be described later on.

In the seating state determination table 109, the number of distances between the marks stored as a point sequence pattern is different among the different seating states. This is because while the number of marks provided on the seat belt 102 is fixed, the presence of a winding-up mechanism of the seat belt 102 changes the number of marks detected by the imaging portion 103 depending upon the seating state. Accordingly, when the seating state is determined, the number of marks detected is taken into consideration.

The distance calculating portion 105 calculates the distance between the occupant 203 and the airbag 107. The distance calculation is carried out based on the barycentric positions of point A and the marks on the seat belt 102 extracted from the image taken by the imaging portion 103. Note that according to the first embodiment, the distance is calculated using the barycentric positions of point A and the marks on the image obtained by the seating state determining portion 104. However, in addition, the barycentric positions may be obtained by newly carrying out the above described process by the distance calculating portion 105.

FIG. 8 is an illustrative graph showing how the distance from the imaging portion 103 to the upper part of the occupant's body 203 is calculated. The fixed point A always represents the same coordinates. The points produced by projecting point A and points M1, M2, . . . representing the barycenters of the marks, to the projection plane are points A', M'1, M'2, . . . , and the coordinates on the projection plane are barycentric coordinates on the image obtained by the seating state determining portion 104. The distance Z between the imaging portion 103 and the projection plane is also always a fixed value. The distances between points A, M1, M2, . . . are equal distances since the marks are provided on the seat belt 102 at equal intervals.

Based on the relationship between point A (x0, y0, z0) and point M1 (x1, y1, z1), the following equation (1) is established:

$$d^2 = (x_1 - x_0)^2 + (y_1 - y_0)^2 + (z_1 - z_0)^2 \quad (1)$$

From the relationship between point M1 (x1, y1, z1) and point M1 (x1', y1', z1') and based on the fact that the value for the Z coordinate of point M1' is always Z, the following equations (2) and (3) are established:

$$x_1 = x'_1 \left(\frac{z_1}{Z}\right) \quad (2)$$

$$y_1 = y'_1 \left(\frac{z_1}{Z}\right) \quad (3)$$

By solving equation (3), using equation (1), a second equation for z1 results and the actual coordinates of point M1 (x1, y1, z1) can be obtained.

Once the coordinates of point M1 are obtained, the coordinates of point M2 (x2, y2, z2) can be obtained because the distance between points M1 and M2 is always d. The coordinates of point M3 and on can be obtained by the same process. If point Mk is obstructed from view by an object, the calculation cannot be carried out by the process. However, once it is determined that point Mk is obstructed, the coordinates can be calculated based on the fact that the distance between point Mk−1 and point Mk+1 equals 2d.

Whether point Mk is obstructed from view by an object can be determined when the distance between the barycenters of the actual marks is found to be larger than the distance d, based on the distances between the barycenters of the marks projected on the projection plane.

Based on the distances between the marks and the imaging portion 103 and the fixed, known distance between the imaging portion 103 and the airbag 107, the distances between the marks and the airbag 107 can also be calculated. The shortest distance among the distances between the marks and the airbag 107 is set as the distance between the upper part of the occupant's body 203 and the airbag 107, such that the inflation amount of the airbag 107 can appropriately be controlled.

However, the distance between the occupant 203 and the airbag 107 is not limited to the shortest distance among the distances between the marks and the airbag 107. For example, the head position of the occupant 203 is estimated based on the coordinates of the marks, and the distance between the estimated head position and the airbag 107 may be employed as the distance between the upper part of the occupant's body 203 and the airbag 107.

The airbag control portion 106 controls the inflation amount of the airbag 107 depending on the seating state determined by the seating state determining portion 104 and the distance between the airbag 107 and the occupant 203 calculated by the distance calculating portion 105. When the seating state determining portion 104 determines the state as "no occupant" or "child safety seat", the airbag 107 is controlled not to inflate, while when the state is determined as "normal posture" or "reclining," the airbag 107 is controlled to normally inflate. When the seating state determining portion 104 determines the state as "leaning forward," the inflation amount of the airbag 107 is controlled depending on the distance calculated by the distance calculating portion 105.

In order to allow the airbag control portion 106 to control the inflation amount of the airbag 107, the amount of explosives detonated is changed depending on the distance between the upper part of the occupant's body 203 and the airbag 107. More specifically, the explosives are formed into packets. When the upper body part of the occupant 203 is close to the airbag, only a first packet is detonated. As the distance increases, second and third packets may additionally be detonated.

An airbag 107 inflates to protect the occupant 203 against an impact in a collision. However, when the occupant 203 leans forward, and the face is positioned too close to the airbag 107, the impact caused by the explosive inflation of the airbag 107 can injure the occupant. Therefore, according to the present embodiment, the airbag control portion 106 can protect the occupant 203 by controlling the inflation amount of the airbag 107 by detecting a distance between the occupant and a predetermined position. According to the first embodiment, the predetermined position corresponds to, but is not limited to, the position of the airbag 107.

Figure 9:
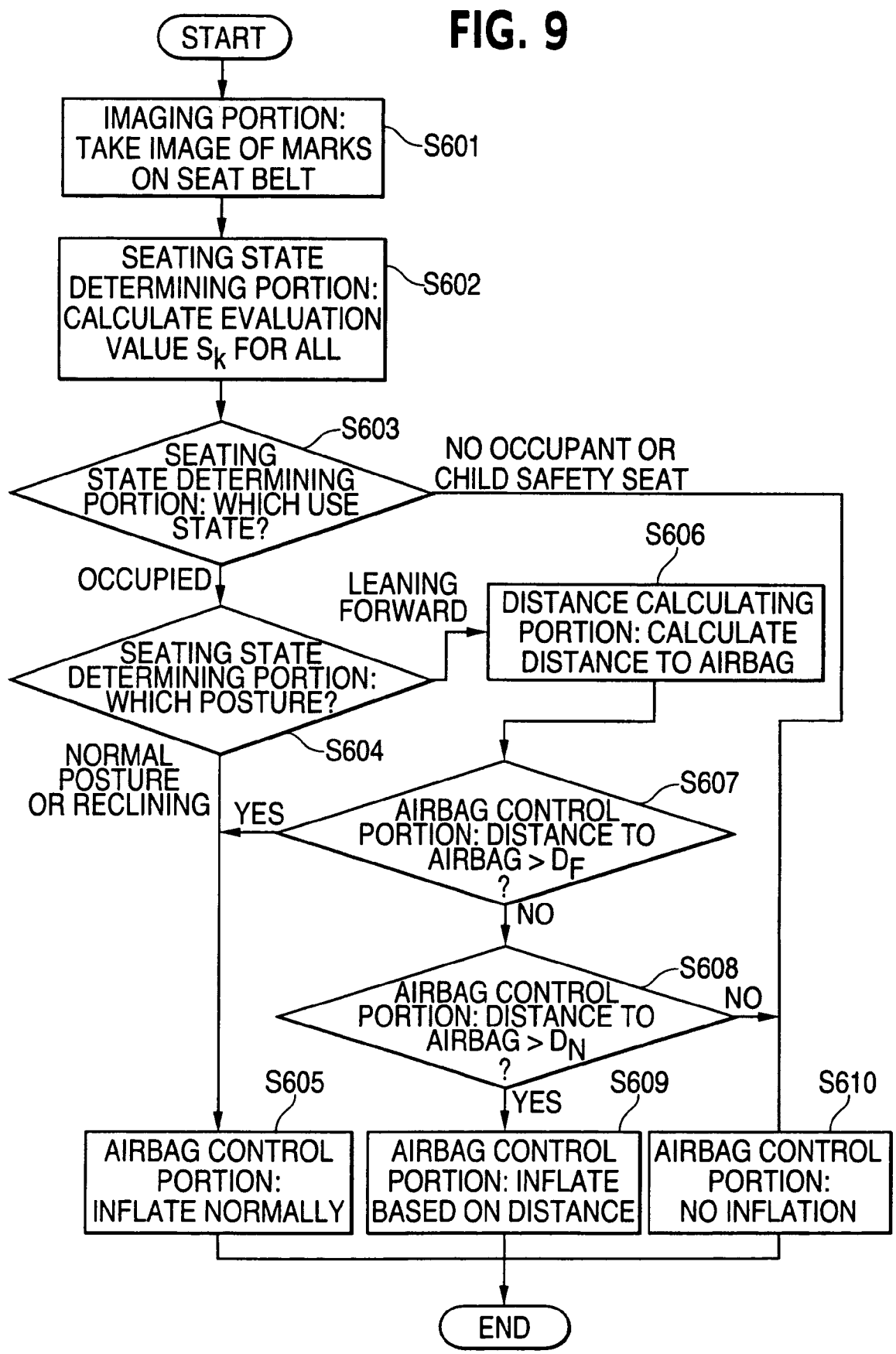
FIG. 9 is a flowchart illustrating the operation of an airbag device according to a first embodiment.

Now, the process from the imaging operation of the imaging portion 103 in the airbag device 100 to controlling the inflation of the airbag 107 by the airbag control portion 106 will be described. FIG. 9 is a flowchart illustrating of the above described processes in the airbag device 100 in accordance with the first embodiment.

The imaging portion 103 takes an image of the marks and points A and B on the seat belt 102 using the infrared light irradiated from the infrared irradiation portion 101 (step S601). It is noted that infrared light is constantly irradiated by the infrared irradiating portion 101.

Then, the seating state determining portion 104 calculates an evaluation value for each of the seating states (step S602). More specifically, the seating state determining portion 104 obtains the distances between the barycenters of the marks on the image taken in step S601, compares the obtained distances between the barycenters of the marks and the distances between the marks for each of the seating states stored in the seating state determination table 109, and calculates an evaluation value for each of the seating states. Now, the method of calculating the evaluation values will more specifically be described.

FIG. 10 shows an example of a seating state determination table 109. In FIG. 10, NP represents the total number of patterns of seating states stored in the seating state determination table 109. A point sequence pattern representing the distances between the marks is prepared for each seating state. The point sequence patterns and the patterns of distances between the barycenters of the marks obtained from the image are the compared, and the most similar pattern is determined as the present seating state.

The following equation (4) is used to compare the point sequence patterns stored in the seating state determination table 109 and the pattern of the distances between the barycenters of the marks obtained from the imaging operation. The number of marks provided on the seat belt 102 is N, and the number of the detected marks is n. The distances between the marks on the projection plane between points A, M1, M2, ..., and MN are Dk1 to DkN and form the point sequence pattern Pk, which is stored by the seating state determination table 109. The distances between the barycenters of the marks on the projection surface obtained by the imaging operation between points A, M1, M2, ..., and Mn are d1 to dn. Evaluation values for the patterns P1 to PNP are S1 to SNP.

$$s_k = \sum_{i=1}^{n} (D_{ki} - d_i)^2 + \sum_{i=n+1}^{N} (D_{ki})^2 \qquad (4)$$

As can be seen from equation (4), the seating state determining portion 104 accumulates square errors based on the distances between the barycenters of the marks obtained and the distances between the marks stored in the seating state determination table 109. Regarding the distances between the marks not detected by the imaging operation, the seating state determining portion 104 squares the distances between the marks, corresponding them to the distances stored in the seating state determination table 109 in the form of a point sequence pattern for addition to the net result. The processing is carried out for all the seating state patterns stored in the seating state determination table 109, and the evaluation values S1 to SNP are calculated.

When it is determined that a mark is obstructed from the view by an object, an evaluation value is obtained while the obstruction is taken into consideration. When, for example, the mark Mk is obstructed from the view, the square error is obtained based on the sum of the distance between Mk−1 and Mk+1 on the image and the distance between the marks in the corresponding point sequence pattern for calculation, such that highly precise matching can be carried out even when the mark is obstructed from the view by an object.

The seating state determining portion 104 determines the usage state of the seat 201 based on the calculated evaluation values S1 to SNP (step S603). More specifically, it is determined whether the S4 or S5 evaluation value is the smallest value. If the S4 or S5 evaluation value is the smallest value, the state is determined as "no occupant" or "child safety seat." If an evaluation value other than the S4 or S5 evaluation value is the smallest, the state is determined as "occupied".

If the seating state determining portion 104 determines the usage state as "occupied," the posture of the occupant 203 is then determined (step S604). More specifically, it is determined whether the occupant 203 is sitting with a normal posture, reclining, or leaning forward. The evaluation values S1 to SNP calculated in step S602 are used for this determination. If S1 is the smallest value, it is determined that the occupant 203 is "leaning forward". If S2 is the smallest value, it is determined that the occupant 203 is sitting with a "normal posture." If S3 is the smallest value, it is determined that the occupant 203 is "reclining."

If the seating state determining portion 104 determines the states as a "normal posture" or "reclining," the airbag control portion 106 causes the airbag 107 to inflate normally in an impact in a collision (step S605).

If the seating state determining portion 104 determines the state as the "leaning forward," the distance calculating portion 105 calculates the distance between the occupant 203 and the airbag 107 (step S606).

The airbag control portion 106 determines whether the distance between the occupant 203 and the airbag 107 is longer than a predetermined distance DF upon an impact in a crash (step S607). If it is determined that the distance between the occupant 203 and the airbag 107 is longer than the predetermined distance DF ("Yes" in step S607), the airbag 107 is inflated normally upon the impact (step S605).

If the distance between the occupant 203 and the airbag 107 is shorter than the predetermined distance DF ("No" in step S607), the airbag control portion 106 continues to determine whether the distance between the occupant 203 and the airbag 107 is longer than a predetermined distance DN (step S608).

If the airbag control portion 106 determines that the distance between the occupant 203 and the airbag 107 is longer than the predetermined distance DN (Yes in step S608), it controls the inflation amount of the airbag 107 based on the distance between the occupant 203 and the airbag 107 upon an impact in a collision (step S609).

Upon determining that the distance between the occupant 203 and the airbag 107 is shorter than the predetermined distance DN ("No" in step S608) or determining the seating state as "no occupant" or "child safety seat" by the seating state determining portion 104 in step S603, the airbag control portion 106 does not cause the airbag 107 to inflate upon an impact in a collision (step S610).

It should be noted that steps S605, S609, and S610 are occurring upon an impact in a collision, and therefore the process returns to step S601 and is carried out from the operation of imaging the marks if there is no collision (not shown).

The predetermined distances DN and DF vary depending on conditions, such as the type of vehicle used. Therefore, appropriate values for DN and DF are determined based on actual measurements.

It is noted that in the flowchart described above, the seating states of the seating state determination table 109 are "no occupant," "child safety seat," "leaning forward," "normal posture," and "reclining." However, the seating states are not limited to these states. The airbag 107 is controlled appropriately depending on other postures of the occupant 203 and the usage state of the seat 201.

Furthermore, according to the first embodiment, the marks provided on the seat belt 102 are detected to determine the seating state. The seating state of the occupant 203 can accurately be determined because erroneous determinations caused by detecting parts of the occupant's body 203 (such as the hand or foot) or his belongings are not made. The distance between the occupant 203 and the airbag 107 is calculated based on the marks provided on the seat belt 102, and the distance between the upper part of the occupant's body 203 and the airbag 107 is calculated without errors in measurement, that would otherwise be caused by detecting the distance between a part of the occupant's body 203 or his belongings and the airbag 107.

Since the seating state of the occupant 203 is appropriately determined and the distance between the upper part of the occupant's body 203 and the airbag 107 can be accurately calculated, the inflation amount of the airbag 107 can be controlled based on the results of the calculated distances.

The distance between the occupant 203 and the airbag 107 miscalculated only when the seating state is "leaning forward," and therefore, the processing can be carried out quickly and appropriately, which alleviates the load of the distance calculating portion 105.

When the seating state is determined as "no occupant" or "child safety seat," the airbag 107 is controlled not to inflate. A more economical airbag can be provided as the occasions of exchanging the airbag 107 and the exchanging operation can be reduced and saved. The inflation amount of the airbag 107 is controlled based on the distance between the entire upper part of the occupant's body 203 fixed by the seat belt 102 and the airbag 107, such that the occupant 203 can be well protected and prevented from being injured by the explosive inflation of the airbag 107 upon an impact in a collision.

The processes from the imaging operation to the determination of the seating state and to the calculation of the distance between the occupant 203 and the airbag 107 are constantly being carried out even absent the occasion of a collision. Airbag control is accurate and quick, as it is based on the previously obtained result of the seating state determination and the previously calculated distance between the occupant 203 and the airbag 107 upon an impact in a collision.

According to the first embodiment, the distance between the occupant 203 and the airbag 107 is calculated when the occupant 203 is leaning forward. The inflation amount of the airbag 107 is controlled not only when the occupant is "leaning forward" but also for any posture in which the occupant 203 could be injured by the explosive inflation of the airbag 107.

In the airbag control device according to the first embodiment, an image of the labels provided on the seat belt is taken, and the seating state of the occupant is determined based on the pattern of the labels in the image. A change in the seating state of the occupant wearing the seat belt is detected based on a change in the pattern of labels. The airbag control device can therefore appropriately control the inflation amount of the airbag depending on the seating state of the occupant.

The airbag control device takes an image of the labels provided on the seat belt and calculates the distance between the occupant and a predetermined position based on the pattern of the labels in the image taken. According to the first embodiment, the airbag control device can appropriately control the inflation amount of the airbag depending on the distance.

Second Embodiment

According to the first embodiment, the airbag device 100 estimates the distance when the occupant leans forward. It is noted that if the condition for "leaning forward" is defined in detail and stored in the seating state determination table 109 used to determine the seating state of the occupant 203, the distance between the occupant 203 and the airbag 107 does not have to be calculated. Therefore, in the airbag device according to the second embodiment, the seating state is determined based on the conditions defined more in detail, and the airbag 107 is controlled based only on the results of such determinations.

Figure 11:
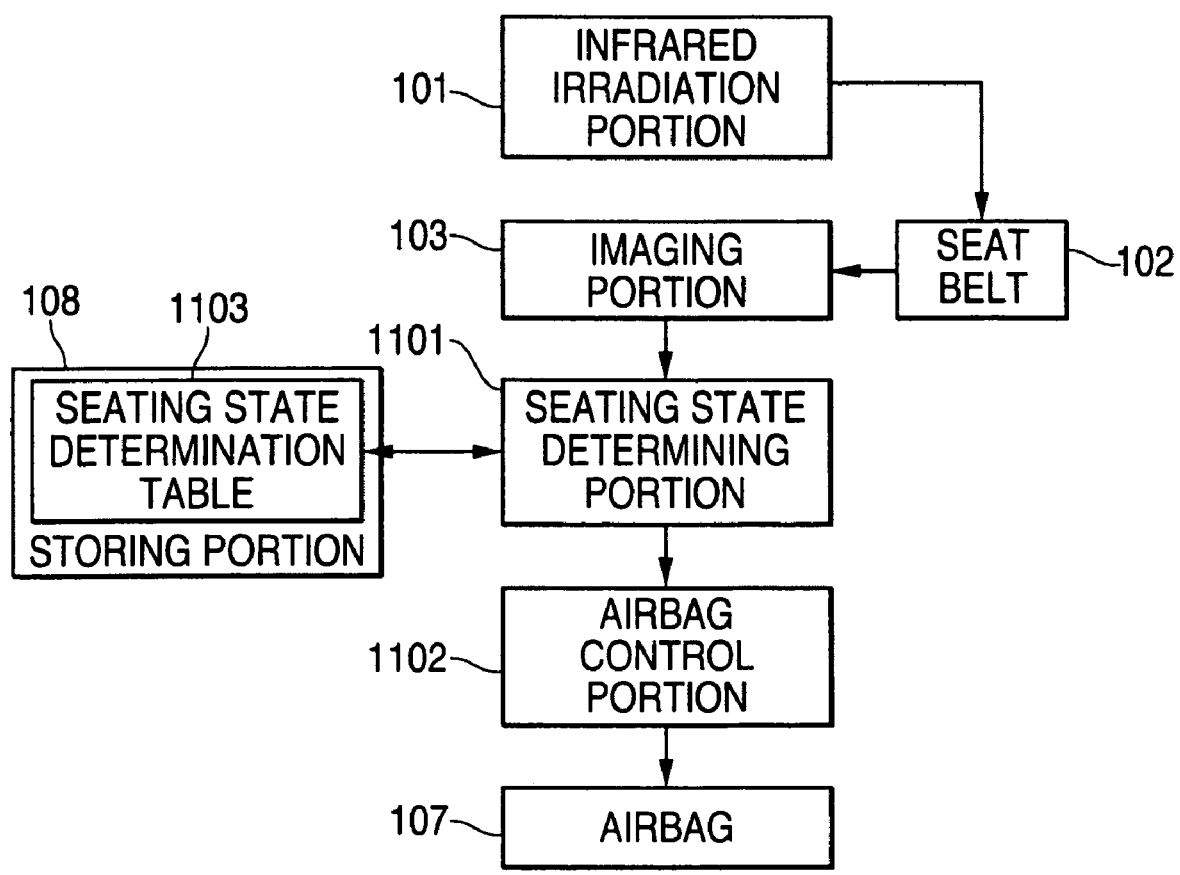
FIG. 11 is a block diagram of the configuration of an airbag device according to a second embodiment of the invention.

FIG. 11 is a block diagram of an airbag device 1100 capable of serving as an occupant classification device according to the second embodiment. The airbag device according to the second embodiment is different from the airbag device 100 of the first embodiment. A seating state determining portion 1101 is also different from the seating state determining portion 104 according to the first embodiment. The distance calculating portion 105 is removed from the airbag device according to the second embodiment. An airbag control portion 1102 is different from the airbag control portion 106 according to the first embodiment. The contents of a seating state determination table 1103 are different from those of the seating state determination table 109. In the following description, the same elements as those of the first embodiment are denoted by the same reference characters and the description is not repeated.

The seating state determining portion 1101 determines the seating state based on marks provided on the seat belt 102 whose image is taken by the imaging portion 103, similarly to the seating state determining portion 104 of the first embodiment. The determining portion 1101 is different from the seating state determining portion 104 in that the processing is different among the seating states stored by the seating state determination table 1103. The result of seating state determination is output only to the airbag control portion 1102.

The seating state determination table 1103 corresponds to the seating state label information and stores patterns of distances between the marks as point sequence patterns in association with the seating states. The point sequence patterns correspond to the mark arrangement information. The table 1103 is different from the seating state determination table 109 of the first embodiment in that it has a plurality of conditions for the posture of "leaning forward." It is noted that the seating state determination table 1103 and a specific method of determining the seating state will be described later.

The airbag control portion 1102 controls the inflation amount of the airbag 107 based on the seating state determined by the seating state determining portion 1101. A specific method of controlling the inflation amount of the airbag 107 will be described later. Note that when the state is determined as "no occupant," "child safety seat," "normal posture," or "reclining," the airbag 107 is controlled in the same manner by the airbag control portion 106 as that of the first embodiment.

Figure 12:
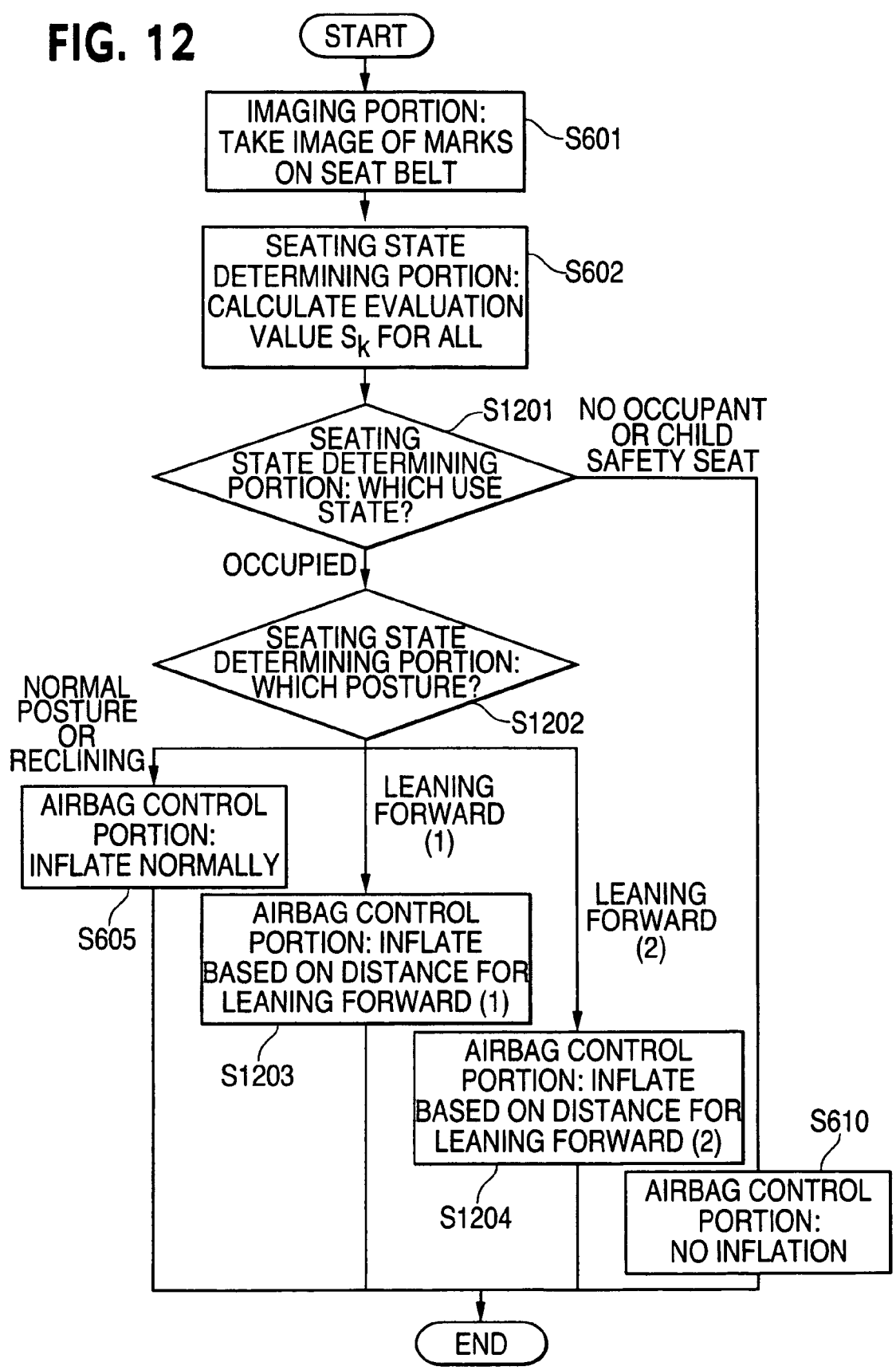
FIG. 12 is a flowchart illustrating the operation of an airbag device according to a second embodiment.

The process from the imaging operation by the imaging portion 103 to the control of the inflation of the airbag 107 by the airbag control portion 106 in the airbag device 1100 in accordance with the second embodiment will now be described. FIG. 12 is a flowchart illustrating the above described process in the airbag device 1100 according to the second embodiment.

Similar to steps S601 to S603 in FIG. 9 according to the first embodiment, the process from the imaging operation by the imaging portion 103 to the determination of the usage state by the seating state determining portion 1101 is carried out by steps S601, S1201, and S603. It should be noted, however, that seating state determination table 1103, instead of seating state determination table 109, is used to calculate an evaluation value Sk in step S1201. FIG. 13 shows an example of a seating state determination table 1103. In the seating state determination table 109 of the first embodiment, only one condition is recorded for the posture of "leaning forward," while there are two conditions recorded for the posture of "leaning forward" in the seating state determination table 1103. Similar to the first embodiment, NP represents the total number of patterns of seating states stored in the seating state determination table 1103.

If the seating state determining portion 104 determines the state as "no occupant" or "child safety seat" in step S603, the airbag control portion 1102 does not cause the airbag 107 to inflate upon an impact in a collision (step. S610).

If the seating state determining portion 104 determines the state as "occupied" in step S603, the seating state of the occupant 203 is further determined (step S1202). In other words, similar to the first embodiment, by using the evaluation values S1 to SNP, it is determined whether the occupant 203 is in the state of "normal posture," "reclining," "leaning forward (1)," or "leaning forward (2)". Note that the "leaning forward (1)" refers to the state in which the occupant slightly leans forward, and the "leaning forward (2)" refers to the state in which the occupant almost fully leans forward. If S1 is the smallest value, it is determined that the occupant 203 is in the posture of "leaning forward (1)." If S2 is the smallest value, it is determined that the occupant 203 is in the posture of "leaning forward (2)." If S3 is the smallest value, it is determined that the occupant 203 is in the "normal posture." If S4 is the smallest value, it is determined that the occupant 203 is in the posture of "reclining."

If the seating state determining portion 1101 determines the state as "normal posture" or "reclining," the airbag control portion 106 normally causes the airbag 107 to inflate upon an impact in a collision similar to the first embodiment (step S605).

If the state is determined as "leaning forward (1)" by the seating state determining portion 1101, the occupant 203 is assumed to be slightly leaning forward, and thus, the airbag control portion 1102 controls the inflation amount of the airbag 107 to be smaller than the normal amount upon an impact in a collision (step S1203). If, for example, the amount of explosives to be detonated to inflate the airbag 107 is formed into three packets, and these three packets are normally detonated, two of the three packets may be detonated if the state is determined as "leaning forward (1)."

If then the state is determined as "leaning forward (2)" by the seating state determining portion 1101, the occupant 203 is assumed to be almost fully leaning forward, and therefore, the airbag control portion 1102 controls the inflation amount of the airbag 107 to be even smaller than the normal amount upon an impact in a collision (step S1204). If for example, the amount of explosives to be detonated to inflate the airbag 107 is formed into three packets, and these three packets are normally detonated, only one of the three packets may be detonated when the state is determined as "leaning forward (1)."

Note that steps S605, S1203, S1204, and S610 are carried out upon an impact in a collision, and therefore if there is no such impact, the process returns to step S601 and starts the step of taking an image of the marks as in the first embodiment (not shown).

In the flowchart described above, the two postures of "leaning forward" are shown only by way of illustration. Other appropriate types of postures may be set according to circumstances. In addition, the inflation amount of the airbag 107 may be controlled for postures other than those of "leaning forward."

According to the second embodiment, by setting more detailed seating states, the airbag 107 can be controlled appropriately and quickly without calculating a distance between the occupant 203 and the airbag 107. Since the distance does not have to be calculated, the amount of calculation operation carried out by the airbag device 1100 can be reduced.

It is noted that the present invention is not limited to the above described embodiments and may be subjected to various modifications, examples of which will be described below.

Modification 1

Figure 14:
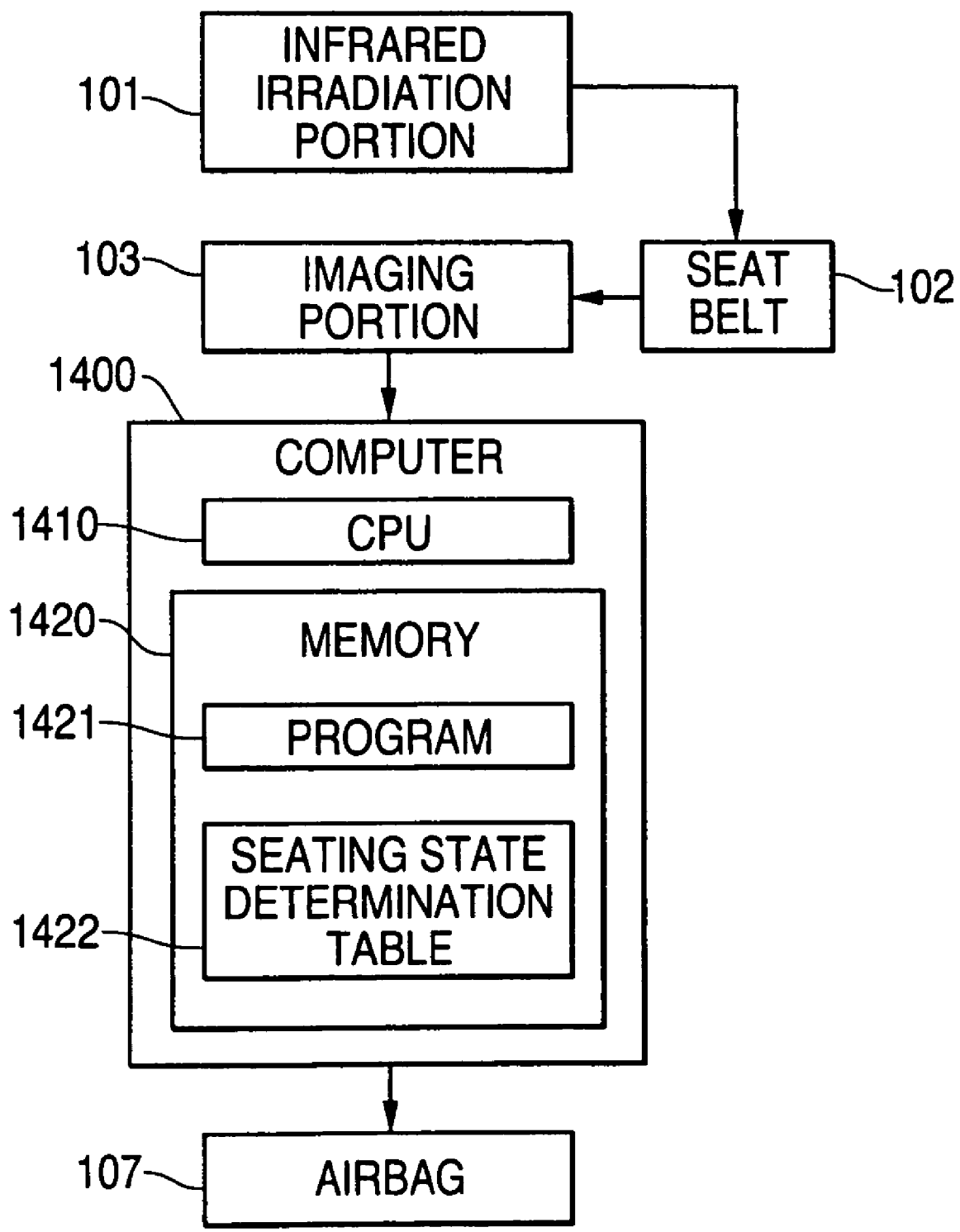
FIG. 14 is an alternate diagram illustrating a modification of the configuration of an air bag device.

The above described seating state determining portion 104 (1101), the distance calculating portion 105, and the airbag control portion 106 (1102) can be implemented by various dedicated hardware circuits. As shown in FIG. 14, a computer 1400 including a CPU (Central Processing Unit) 1410 and a memory 1420 may be used to achieve the above described embodiments by using a software program 1421 to enable the computer to carry out the processing to determine the seating state according to the embodiments, estimate the distance to the occupant 203 or the processing to control the airbag 107 as required.

More specifically, the program 1421 to enable the computer to carry out the seating state determination, the distance estimation, and the airbag control may be stored in the memory 1420 of the computer 1400. Then, the computer 1400 may operate to read out and carry out the program 1421. In this way, the airbag device can be implemented carryout the same processing as the airbag device according to the embodiments above. In this case, a seating state determination table 1422 may be stored in the memory 1420.

More specifically, the program carried out by the airbag device is in the form of a module including the above described elements (the seating state determining portion 104, the distance calculating portion 105, and the airbag control portion 106) when the function of the first embodiment is implemented by software. As the CPU 1410 reads out the program from the memory 1420 and executes the program, the functions of the seating state determining portion 104, the distance calculating portion 105, and the airbag control portion 106 are implemented.

Alternatively, as a program to be executed by the airbag device is in the form of, a module configuration including the above describe elements (the seating state determining portion 1101, and the airbag control portion 1102) when the function of the second embodiment is implemented by software. Furthermore, the above-described elements may only partly be implemented by software.

Modification 2

The marks provided on the seat belt 102 of the airbag device according to the embodiments described above are dark circles. However, the shape or size of the mark may be different among the marks. By changing the shape or size for each of the marks, it can be easy to determine which mark is obstructed from the view. Alternatively, the marks may be coated with different light emitting substances or reflector materials on a mark-by-mark basis, such that each mark is irradiated with a different light at fixed intervals. Accordingly, the marks responding and not responding to each kind of light may be detected to determine whether the marks are obstructed from the view. Since it is easy to determine whether the marks are obstructed based on such marks on the seat belt 102, the seating state and the distance between each of the marks and airbag 107 can be determined and obtained more accurately.

Modification 3

The following description relates to other examples of the seating state determining portion 104 and the marks on the seat belt 102.

Figure 15:
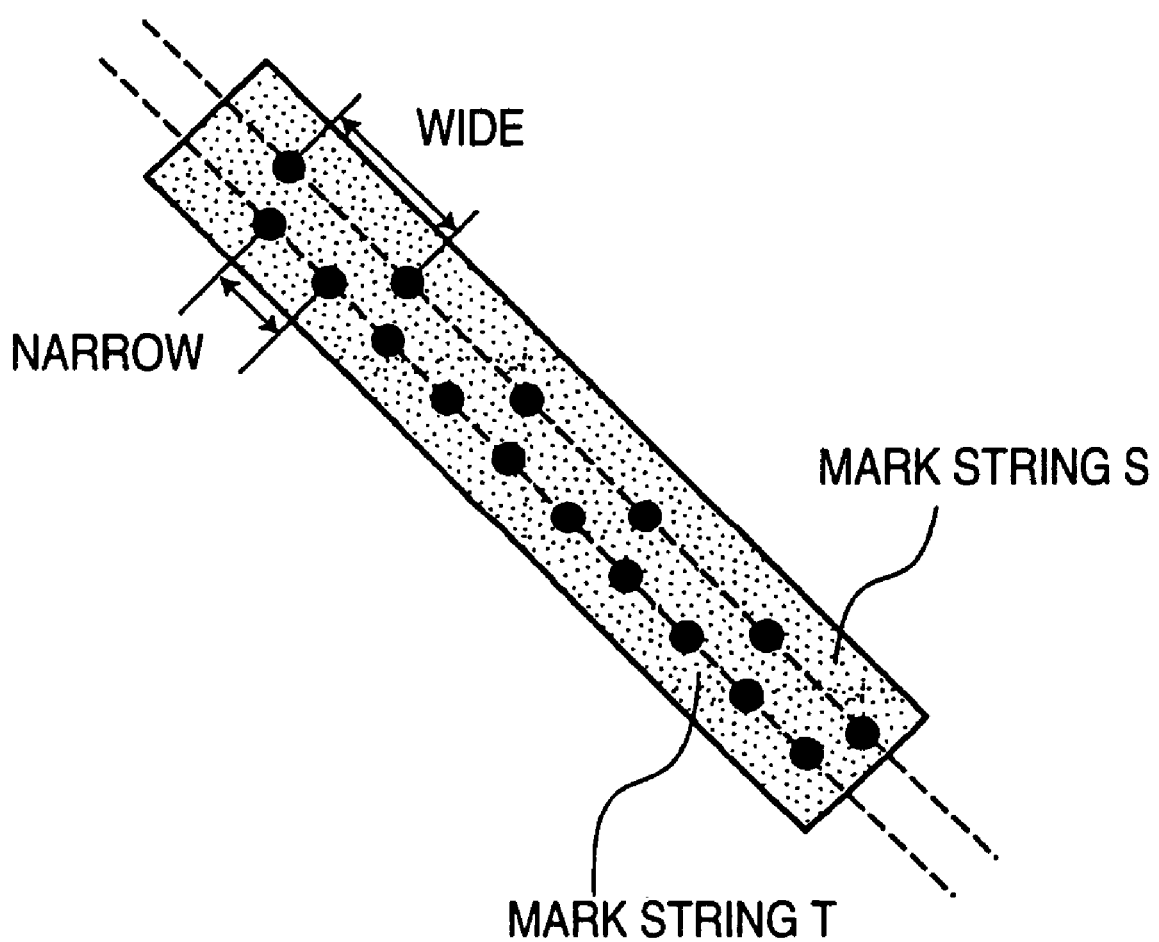
FIG. 15 is an example of an image input to a seating state determining portion.

FIG. 15 shows an example of an image taken by the imaging portion 103 and input to the seating state determining portion 104. According to the modification, the seat belt 102 is provided with strings of marks (mark strings S and T) discretely arranged at two different intervals in the lengthwise direction of the seat belt 102. That is, each of mark strings S and T is a series of marks distributed along the length of seat belt 102. The seating state determining portion 104 digitizes the input image by a general digitizing method. The seating state determining portion 104 extracts the marks in the prescribed shape provided on the seat belt 102. The seating state determining portion 104 then obtains the coordinates of the marks in the mark strings S and T.

It is noted that the digitizing method is employed only by way of illustration. The seating state determining portion 104 may use a multi-valued image. For example, the image may be separated between regions having pixel values of 0 and 255.

According to the modification, the marks are dark circles, and therefore, the seating state determining portion 104 extracts the region in which black pixels are coupled. The seating state determining portion 104 determines the extracted region as a mark if the size of the extracted region is within predetermined thresholds. The seating state determining portion 104 then obtains the barycentric coordinates of the region determined as the mark and uses those coordinates as the coordinates of the mark. It should be noted that the "size of the extracted region" may be the diameter, length, or a diagonal.

According to the modification, the method of obtaining the barycentric coordinates of the marks is employed, but the method is not limited to this. For example, the seating state determining portion 104 may approximate the contour of the shape of the extracted mark by a circle, and the central coordinates of the circle may be used as the coordinates of the mark.

The seating state determining portion 104 obtains the coordinates of points corresponding to points A and B in FIG. 3, in addition to the coordinates of the marks in the mark strings S and T.

Figure 16:
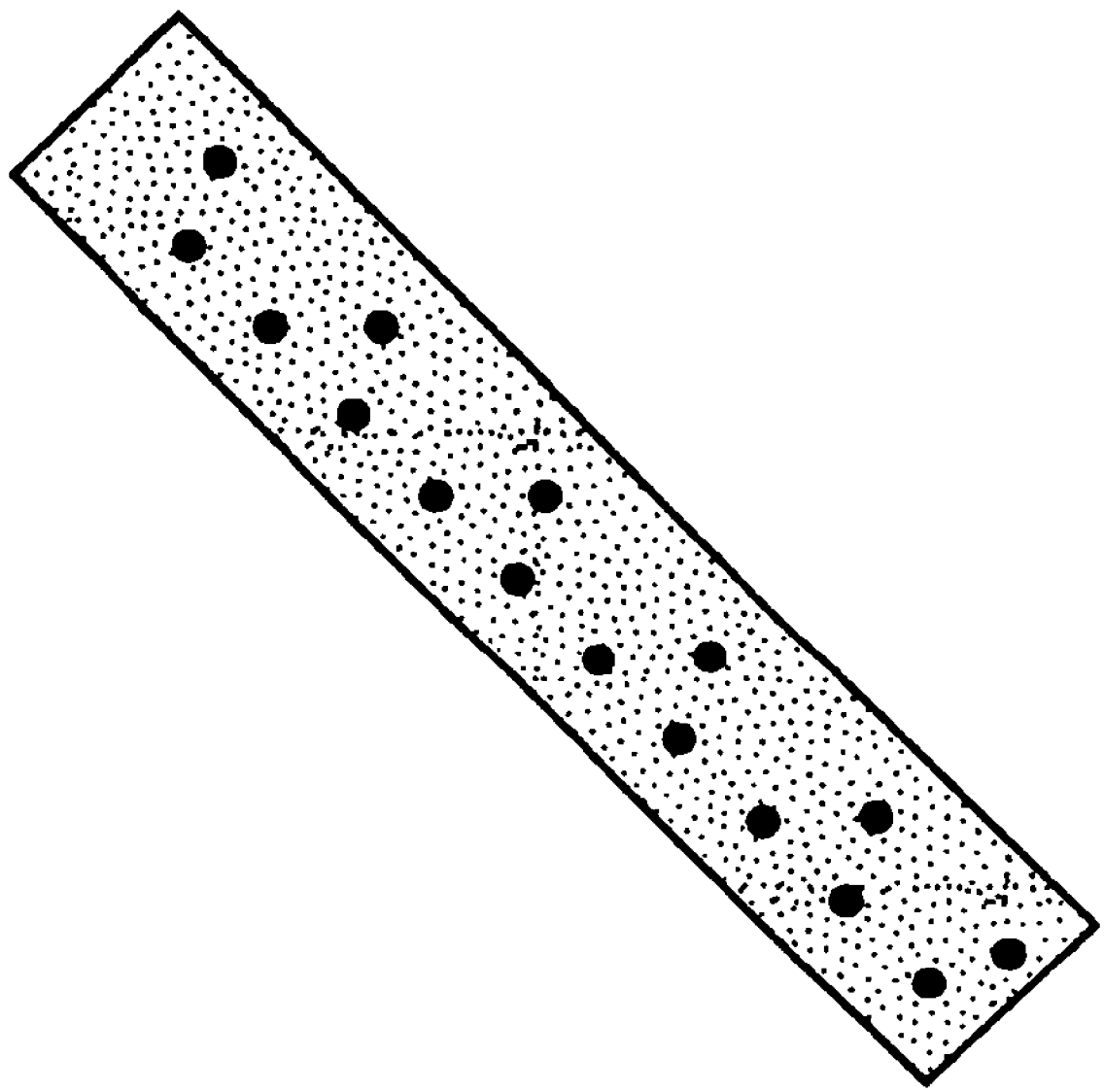
FIG. 16 is an example of the barycentric coordinates of marks obtained by a seating state determining portion.

FIG. 16 shows the barycentric coordinates of the marks in FIG. 15 obtained from the image by the above described method. It is noted that the thresholds for determining if the mark is a region in which black pixels are coupled are determined based on the size of the mark and the distance from the imaging portion 103 to the seat belt 102.

Figure 17:
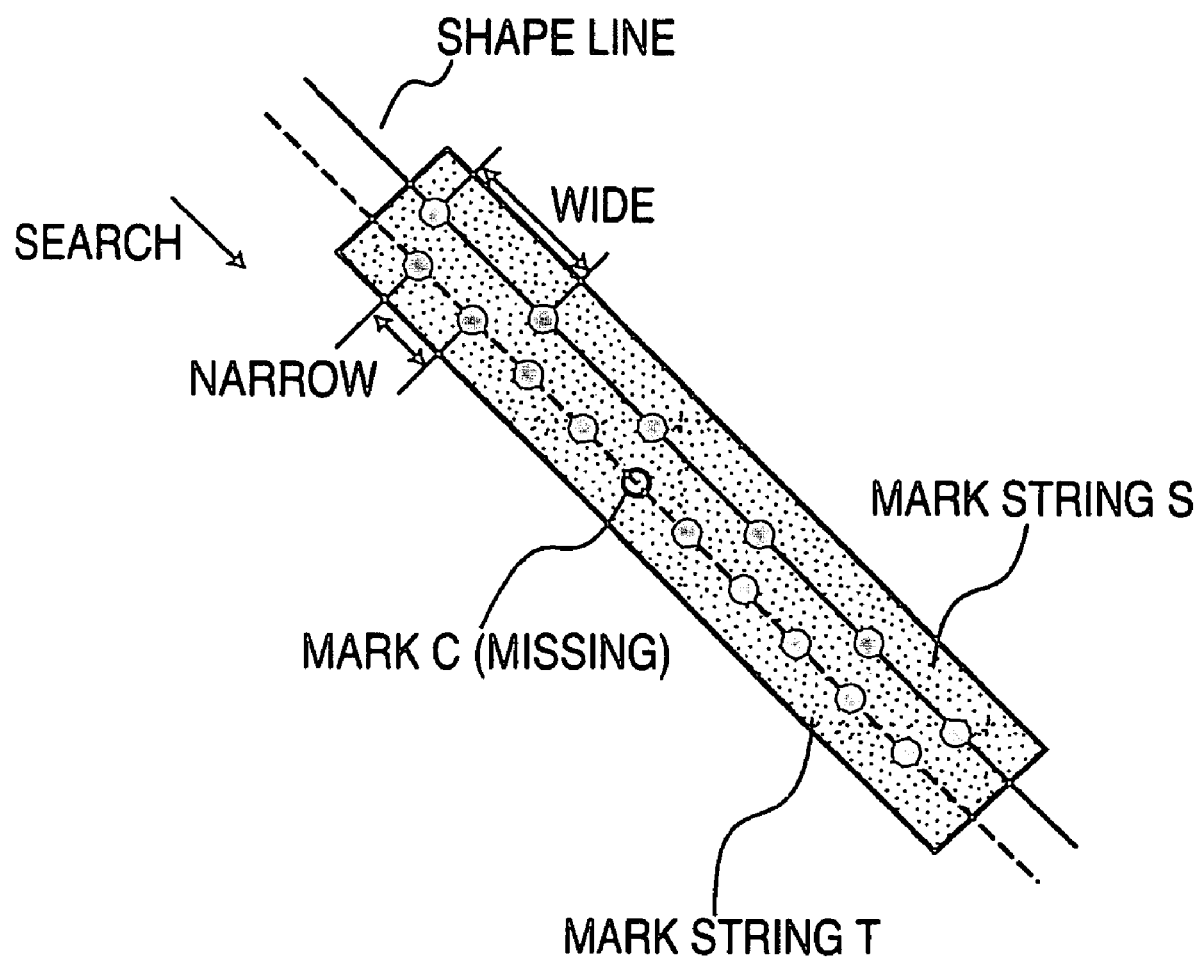
FIG. 17 is an example of an image input to a seating state determining portion when marks are partly obstructed from view.

FIG. 17 shows the case where a part of the mark string is obstructed by occupant's body or belongings and cannot be detected. In FIG. 17, the mark C in the mark string T shown in FIG. 15 cannot be detected.

The seating state determining portion 104 estimates the coordinates of the mark C missing in the detected result of the mark string T using the mark strings S and T arranged at different intervals. The seating state determining portion 104 obtains a shape line L as a line (curved or straight line) approximate to the shape of the seat belt 102 using the arrangement of the marks in the mark string S. The seating state determining portion 104 searches for marks on the mark string T in the direction perpendicular to the points on the shape line L.

When the mark intervals in the mark strings S and T obtained from the image are both equal, the seating state determining portion 104 can find the marks in the mark string T substantially at fixed intervals (discovery intervals) on the shape line L excluding the missing part by the search. For the missing part, the discovery interval is larger than the others, and therefore, the approximate position of the missing part can be estimated based on the average of the discovery intervals.

It is noted that when the mark intervals in the mark strings S and T on the image are not equal, the discovery intervals can be corrected to be equal intervals using the ratio of the mark intervals in the mark string S, for example, or the missing part can be estimated using the ratio of the intervals as a weighting factor.

In the foregoing process, the missing part of the mark string T is estimated using the mark string S, while the same processing can be carried out in the opposite case. By using a plurality of mark strings having marks arranged at different mark intervals, the coordinates of a missing part in one string can be estimated using another mark string.

The seating state determining portion 104 compares the pattern of distances between the barycentric coordinates of the marks on the obtained image to the patterns of distances between the marks stored in the seating state determination table 109. As a result of comparison, the seating state of the occupant 203 associated with the most similar mark distance pattern is determined as the present seating state of the occupant 203. The method according to the first or second embodiment may be employed as the method of determining the seating state using the extracted marks.

According to the modification, by using a plurality of mark strings having marks arranged at different mark intervals, the mark strings can more stably be detected. Consequently, the seating state of the occupant can accurately be estimated based on the mark strings.

It should be noted that when there are a plurality of mark strings at equal intervals and a mark is missing in one mark string, a mark in the same location in another mark string could be missing, which may make it difficult to estimate the missing parts. However, if the mark strings are arranged a suitable distance apart (for example, a distance as large as the width of the seat belt 102), it is highly unlikely that the marks are both missing at the same time. Therefore, a plurality of mark strings having marks arranged at equal intervals may be used.

Modification 4

The modification relates to another example of the seating state determining portion 104 and marks on the seat belt 102.

Figure 18:
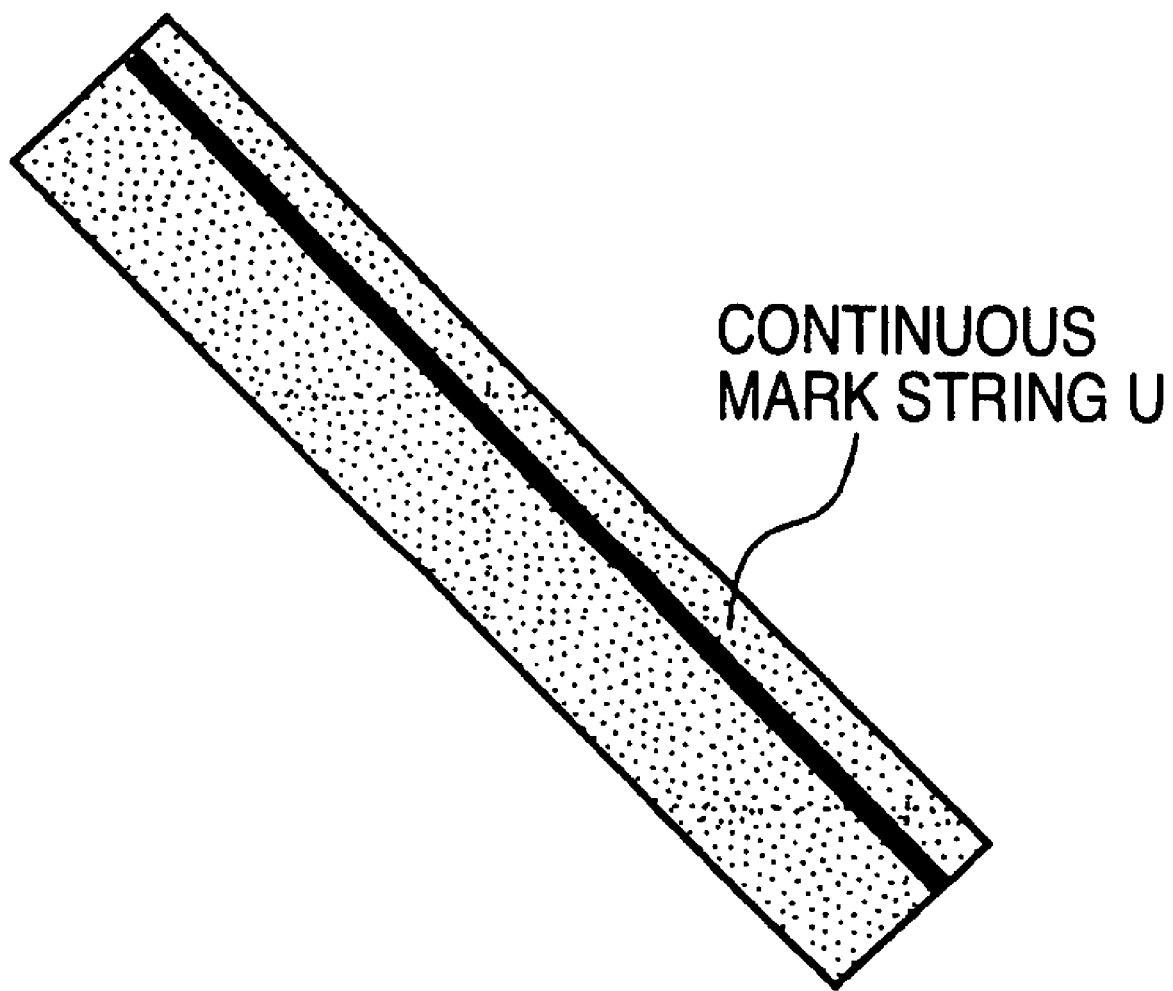
FIG. 18 is an example of an image input to a seating state determining portion when a straight line mark string is used.

FIG. 18 shows a mark string having continuous marks on the seat belt 102. FIG. 18 is an example of an image input to the seating state determining portion 104. In this example, a mark string (mark string U) has marks continuous in the lengthwise direction of the belt. The seating state determining portion 104 carries out digitization to the input image by a general digitizing method and extracts the shape of predetermined marks provided on the seat belt 102.

Since the mark string U is in the shape of a dark line, the seating state determining portion 104 extracts a region of continuous black pixels in the image. The seating state determining portion 104, for example, thins the line and then obtains the shape line L representing the shape of the seat belt 102, analyzes the shape line L, and estimates the posture of the occupant or the distance.

Figure 19A:
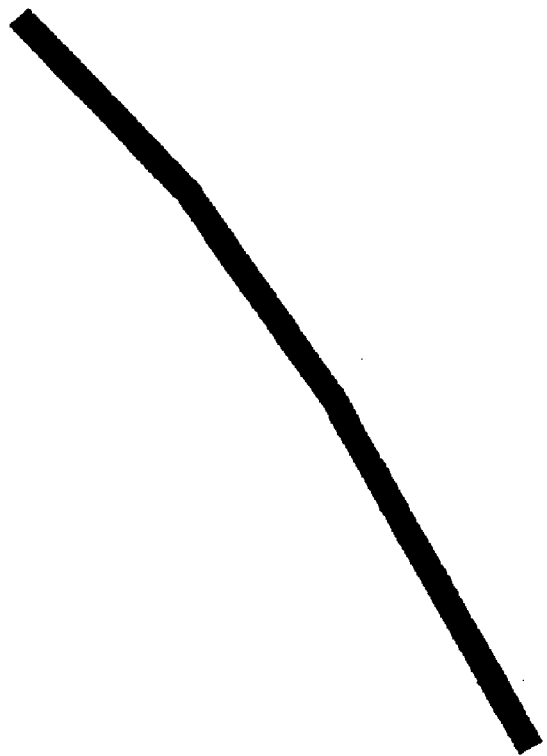
FIG. 19A is an example of an image input to a seating state determining portion when an occupant sits back deeply in the seat.
Figure 19B:
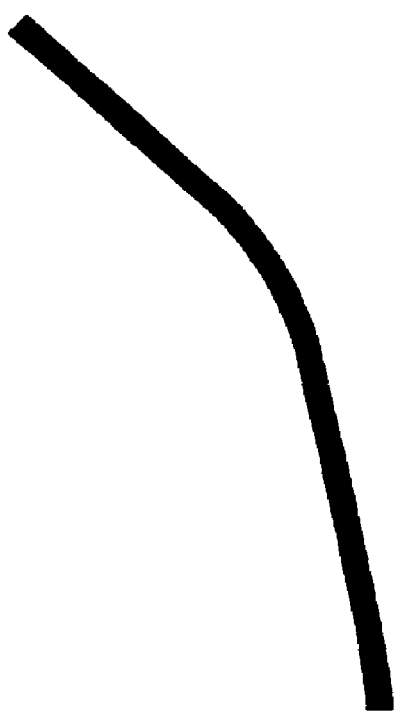
FIG. 19B is an example of an image input to a seating state determining portion when an occupant leans forward.

FIG. 19A shows an example of marks when the occupant sits back deeply in the seat. FIG. 19B shows an example of marks when the occupant leans forward. When the imaging portion 103 is not located right in front of the occupant, a bending point is generated in the seat belt 102 near the shoulder of the occupant. The seating state determining portion 104 extracts the bending point on the shape line L obtained from the mark string U. The seating state determining portion 104 then obtains a point where the curvature of the shape line L changes more greatly than a predetermined reference, and detects the bending point. It is noted that in addition to using the change in curvature, the seating state determining portion 104 may determine the bending point by other methods such as using a change in the angle, the angle, and the actual curvature.

FIG. 20 shows an example of an extracted bending point F. The bending point F corresponds to the position of the shoulder of the occupant. The region above the shoulder (region (a) in FIG. 20) can be considered to substantially correspond to the position of the face.

The face position detection is frequently used in the process of detecting the direction of the face, a nodding off state, or recognizing the face. According to the modification, by using the information in the estimated position of the face, the searching range may be restricted or the searching starting point may be set, such that the amount of calculation operation necessary for detecting the position of the face may be reduced.

The seating state determining portion 104 divides the shape line L into an upper line segment (b) and a lower line segment (c) at the bending point. The seating state determining portion 104 approximates the upper line segment (b) and the lower line segment (c) by straight lines and obtains the angle θ at the bending point F. Then, the posture of the occupant is estimated based on the obtained angle θ.

The seat belt 102 follows the movement of and substantially fits the upper part of the occupant's body. Therefore, if the occupant leans forward, the angle θ at the bending point F is greater, whereas, the angle θ is smaller when the occupant sits back deeply in the seat.

It is noted that a relationship similar to the relationship between the angle θ at the bending point F and the seating state of the occupant exists between the curvature of the shape line L at the bending point F and the seating state of the occupant. Accordingly, the angle θ at the bending point F and the curvature at the bending point F may be used interchangeably for seating state determination.

The seating state determination table 109, according to the modification, stores the relationship between the straight line patterns (such as the angles θ at the bending point F) and the seating states of the occupant. The seating state determining portion 104 calculates similarities between the straight line patterns and the straight line patterns stored in the seating state determination table 109. The seating state determining portion 104 then estimates the seating state of the occupant associated with the most similar straight line pattern as the present seating state of the occupant.

According to the modification, the airbag control device takes an image of the labels continuously provided on the seat belt and obtains the bending point F in the label string. The airbag control device can estimate the positions of the occupant's shoulder and face based on the bending point F in the label string. The airbag control device can also appropriately control the inflation amount of the airbag based on the position of the face.

Modification 5

Now, another example of the seating state determining portion 104 will be described in detail.

Figure 21:
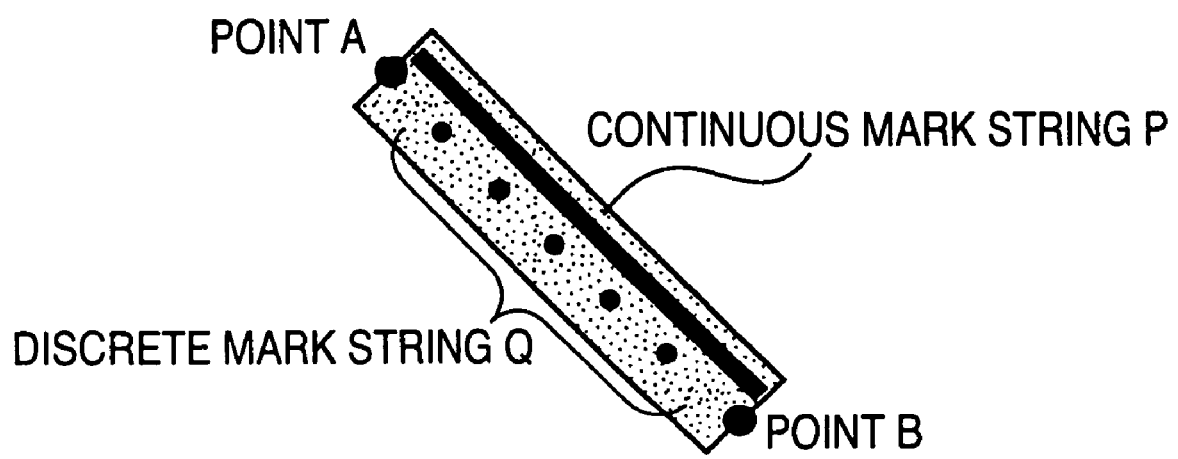
FIG. 21 is an example of an image input to a seating state determining portion when both continuous marks and discrete marks are provided.

FIG. 21 shows an example of an image taken by the imaging portion 103 and input to the seating state determining portion 104. In this example, a continuous mark string P and a discrete mark string Q are provided in the lengthwise direction of the seat belt 102. The continuous mark string P is a straight mark string extending in the lengthwise direction of the seat belt. The discrete mark string Q has a plurality of marks discretely distributed in the lengthwise direction of the seat belt. The seating state determining portion 104 digitizes the input image by a general digitizing method and extracts the predetermined shape of the marks provided on the seat belt 102.

Since the continuous marks P, according to the modification, are formed into a straight line, the segments can be extracted by a line thinning process. The marks in the discrete mark string Q are dark circles, and therefore, a region having continuous black pixels is extracted. If the extracted region has a size within the range of predetermined thresholds, the region is determined as a mark and the coordinates representing the barycenter of the region are obtained. It is noted that other than obtaining the barycentric coordinates, the contour of the shape of the extracted mark may be extracted and the central coordinates may be obtained by approximating the shape by a circle.

Figure 22:
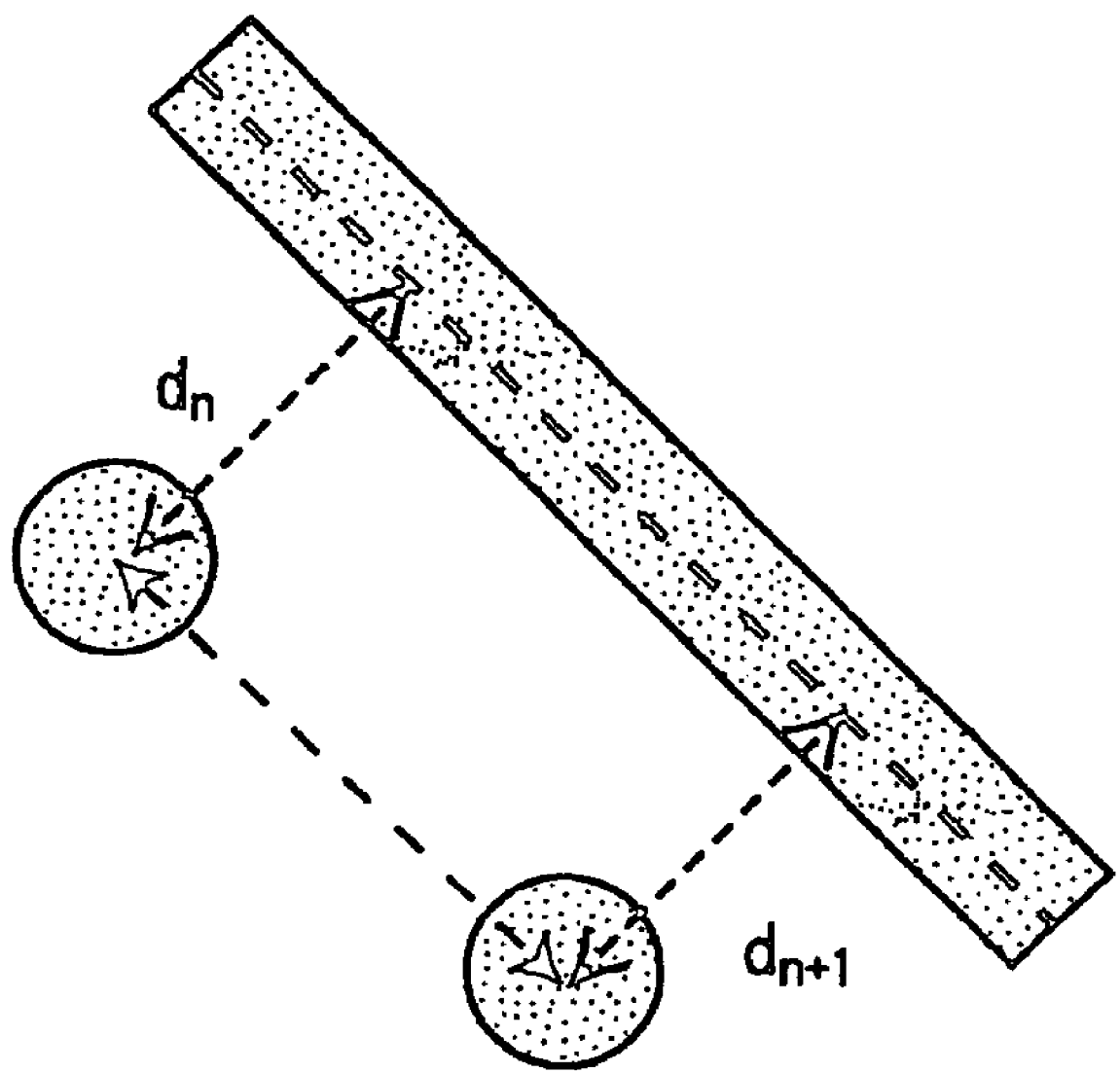
FIG. 22 is a partially enlarged view of FIG. 21.

In addition to the marks in the discrete mark string Q, the barycentric coordinates of points A and B are obtained. FIG. 22 is a partially enlarged view of the seat belt 102 in FIG. 21. FIG. 22 shows the distances dn and dn+1 between a straight line segment of the continuous mark string P and the barycentric coordinates of marks in the discrete mark string Q obtained by the process described above, based on the image taken in FIG. 21. It should be noted that the thresholds for determining whether a region having continuous black pixels is a mark are determined based on the physical size of the mark provided on the seat belt 102 and the distance between the imaging portion 103 and the seat belt 102.

The seating state determining portion 104 detects the bending point A in the straight line, as required, and detects the distances between the marks and the straight line (d1 to dn).

According to the modification, the seating state determination table 109 stores the patterns of distances between the marks and the straight line and the seating states of the occupant in association with one another. The seating state determining portion 104 compares the distance patterns between the barycentric coordinates of the marks on the obtained image to the distance patterns between the marks and the straight line stored in the seating state determination table 109 to calculate similarities. The seating state associated to the most similar pattern is determined as the present seating state of the occupant.

The method of determining the seating state using the marks may be the method according to the first or second embodiment.

When the actual distances between the marks and the straight line are known, the actual distance to the bending point can be estimated based on the distance obtained on the image. The bending point on the seat belt 102 can be considered as the position of the occupant's shoulder, and therefore, the airbag control device, according to the modification, can obtain the distance to the shoulder. The position of the face of a person can roughly be estimated based on the position of the person's shoulder. The airbag control device can therefore also estimate the distance to the position of the face.

Once the distance to the position of the face is estimated, the inflation amount and speed of the airbag can be controlled depending on the distance, such that the impact upon the occupant when the airbag inflates can be reduced.

The airbag control device, according to the modification, takes an image of the continuous labels and discrete labels provided on the seat belt. The airbag control device then obtains the distance between the continuous labels and the discrete labels based on the labels whose image was taken. The airbag control device can calculate the distance between the occupant wearing the seat belt and a predetermined position based on the distances between the labels, such that the inflation amount of the airbag can appropriately be controlled.

It will be apparent to those skilled in the art that various modifications and variations can be made in the disclosed device without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An airbag device, comprising:
   a seat belt;
   a light source which irradiates the seat belt;
   a string of labels on the seat belt, the string of labels being made of a material that reflects light from the light source more strongly than does the seat belt;
   a camera which takes an image of the string of labels on the seat belt;
   an airbag having a mechanism for adjusting an inflation amount or an inflation speed of the airbag;
   a processor; and
   a memory accessible by the processor,
   wherein the memory stores:
      table data that associates arrangement patterns with seating states, the seating states including a presence, an absence, and a posture of an occupant, and
      program code executed by the processor, the program code including steps of:
         detecting an arrangement pattern of the string of labels from the image,
         estimating a seating state of an occupant fastening the seat belt by comparing the detected arrangement pattern with the arrangement patterns in the table data, and
         controlling the inflation amount or the inflation speed of the airbag according to the estimated seating state.

* * * * *